(12) United States Patent
Treece et al.

(10) Patent No.: US 8,938,109 B2
(45) Date of Patent: Jan. 20, 2015

(54) IMAGE DATA PROCESSING SYSTEMS FOR ESTIMATING THE THICKNESS OF HUMAN/ANIMAL TISSUE STRUCTURES

(75) Inventors: Graham Michael Treece, Cambridge (GB); Kenneth Poole, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 306 days.

(21) Appl. No.: 13/500,561

(22) PCT Filed: Oct. 6, 2010

(86) PCT No.: PCT/GB2010/051671
§ 371 (c)(1),
(2), (4) Date: May 22, 2012

(87) PCT Pub. No.: WO2011/042738
PCT Pub. Date: Apr. 14, 2011

(65) Prior Publication Data
US 2012/0224758 A1  Sep. 6, 2012

(30) Foreign Application Priority Data
Oct. 7, 2009  (GB) .................................. 0917524.1

(51) Int. Cl.
G06K 9/00 (2006.01)
G06T 7/00 (2006.01)
(52) U.S. Cl.
CPC ............. G06T 7/0012 (2013.01); G06T 7/0083 (2013.01); G06T 7/0089 (2013.01); *G06T 2200/24* (2013.01); *G06T 2207/10081* (2013.01); *G06T 2207/20108* (2013.01); *G06T 2207/30008* (2013.01)
USPC ........................................................ 382/131

(58) Field of Classification Search
None
See application file for complete search history.

(56) References Cited

U.S. PATENT DOCUMENTS 8,031,919 B2 * 10/2011 Eskildsen et al. ............. 382/128
2008/0015433 A1 * 1/2008 Alexander et al. ............ 600/427
2012/0224758 A1 * 9/2012 Treece et al. ................. 382/131

FOREIGN PATENT DOCUMENTS

GB  2379113 A  2/2003
GB  WO 2011042738  *  4/2011
(Continued)

OTHER PUBLICATIONS

Gordon, C. L., et al. "Image-based assessment of spinal trabecular bone structure from high-resolution CT images." Osteoporosis international 8.4 (1998): 317-325.*

(Continued)

*Primary Examiner* — Tahmina Ansari
(74) *Attorney, Agent, or Firm* — Loginov & Associates, PLLC; William A. Loginov

(57) ABSTRACT

We describe a method of estimating the thickness of a tissue structure, in particular cortical bone thickness from tomographic imaging data such as CT data. The method models the tissue structure as a variation of an imaging parameter along a line; models a variation of the tomographic imaging data along the line as a blurred version of the variation of the imaging parameter modelling the; and fits the blurred tomographic imaging model to data from the tomographic imaging by holding a tissue modelling parameter at a constraining value and allowing variation of a blurring parameter and at least one parameter defining the thickness of the tissue structure to determine an estimate of the thickness of the structure.

20 Claims, 22 Drawing Sheets

(56) References Cited

FOREIGN PATENT DOCUMENTS

WO     2004086972 A2    10/2004
WO     2005091222 A2    9/2005

OTHER PUBLICATIONS

Zhou et al. "Automated measurement of bone-mineral-density (BMD) values of vertebral bones based on X-ray torso CT images", 31st Annual International Conference of the IEEE EMBS Minneapolis, Minnesota, USA, Sep. 2-6, 2009.*

Dougherty, Geoffrey, and Geoffrey M. Henebry. "Lacunarity analysis of spatial pattern in CT images of vertebral trabecular bone for assessing osteoporosis." Medical engineering & physics 24.2 (2002): 129-138.*

Prevrhal, et al., "Accuracy of CT-Based Thickness Measurement of Thin Structures: Modeling of Limited Spatial Resolution in All Three Dimensions", "Medical Physics", Jan. 1, 2003, pp. 1-8, vol. 30, No. 1, Publisher: Am. Assoc. Phys. Med., Published in: US.

Prevhal, et al., "Accuracy Limits for the Determination of Cortical Width and Density: The Influence of Object Size and CT Imaging Parameters", "Phys. Med. Biol.", Nov. 16, 1998, pp. 751-764, vol. 44, Publisher: IOP Publishing Ltd, Published in: UK.

Cheng, et al., "Accurate Thickness Measurement of Two Adjacent Sheet Structures in CT Images", "Transactions on Information and Systems", Jan. 1, 2007, pp. 271-282, vol. E90-d, No. 1, Publisher: IECE, Published in: US.

Burger, et al., "Mitchell-Netravali Approximation", "Principles of Digital Image Processing: Core Algorithms", 2009, pp. 222-223, Publisher: Springer, Published in: US.

Treece, et al., "High Resolution Cortical Bone Thickness Measurement From Clinical Data", "Medical Image Analysis", Jan. 25, 2010, pp. 276-290, vol. 14, No. 3, Publisher: Elsevier, Published in: UK.

Mittrapiyanuruk, "A Memo on How to Use the Levenberg-Marquardt Algorithm for Refining Camera Calibration Parameters", Published in: US, 2006. Available online: https://engineering.purdue.edu/kak/computervision/ECE661/HW5_LM_handout.pdf.

Streekstra, et al., "Model-Based Cartilage Thickness Measurement in the Submillimeter Range", "Medical Physics", Aug. 20, 2007, pp. 3562-3570, vol. 34, No. 9, Publisher: Am. Assoc. Phys. Med., Published in: US.

Treece, et al., "Regularised Marching Tetrahedra: Improved ISO-Surface Extraction", "Computers & Graphics", 1999, pp. 583-598, vol. 23, Publisher: Elsevier Science, Ltd., Published in: UK.

Treece, et al., "Surface Interpolation for Sparse Cross-Sections Using Region Correspondence", "Transactions on Medical Imaging", Nov. 2000, pp. 1106-1114, vol. 19, No. 11, Publisher: IEEE, Published in: US.

\* cited by examiner

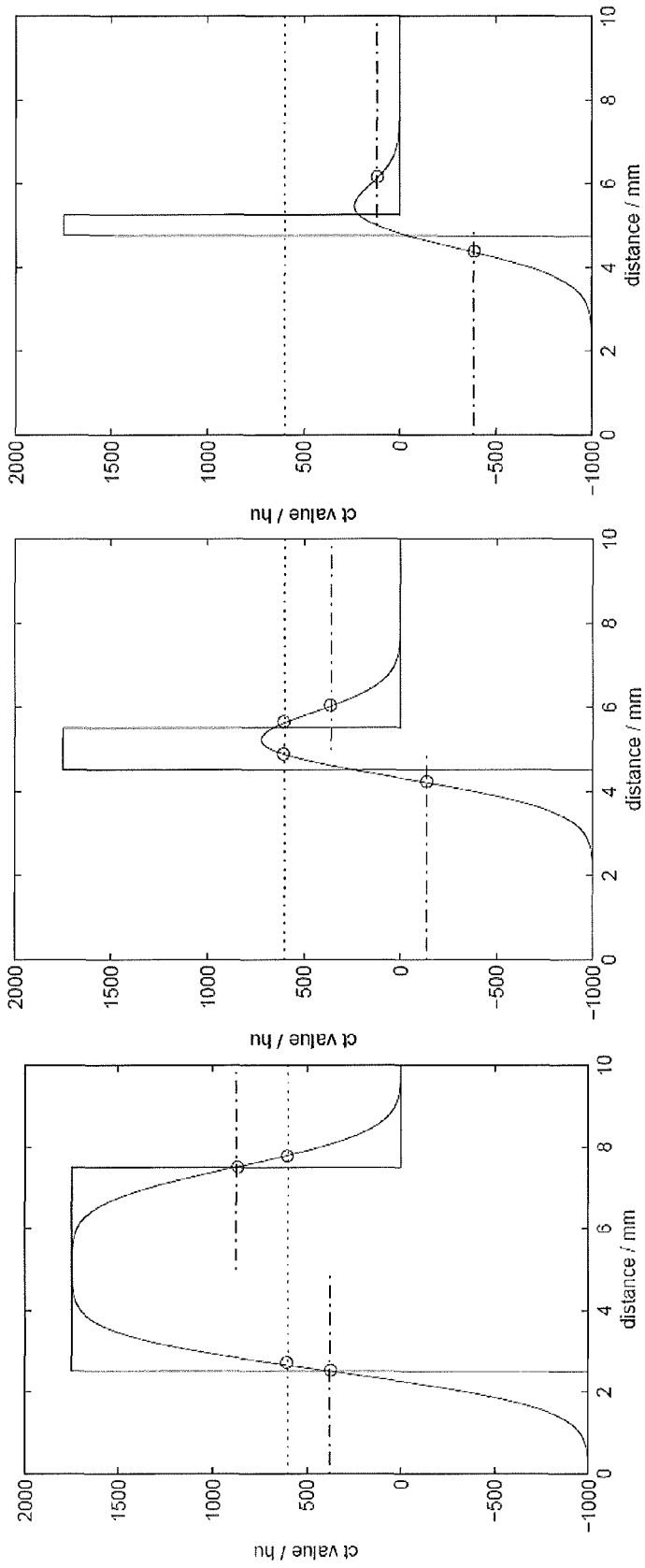

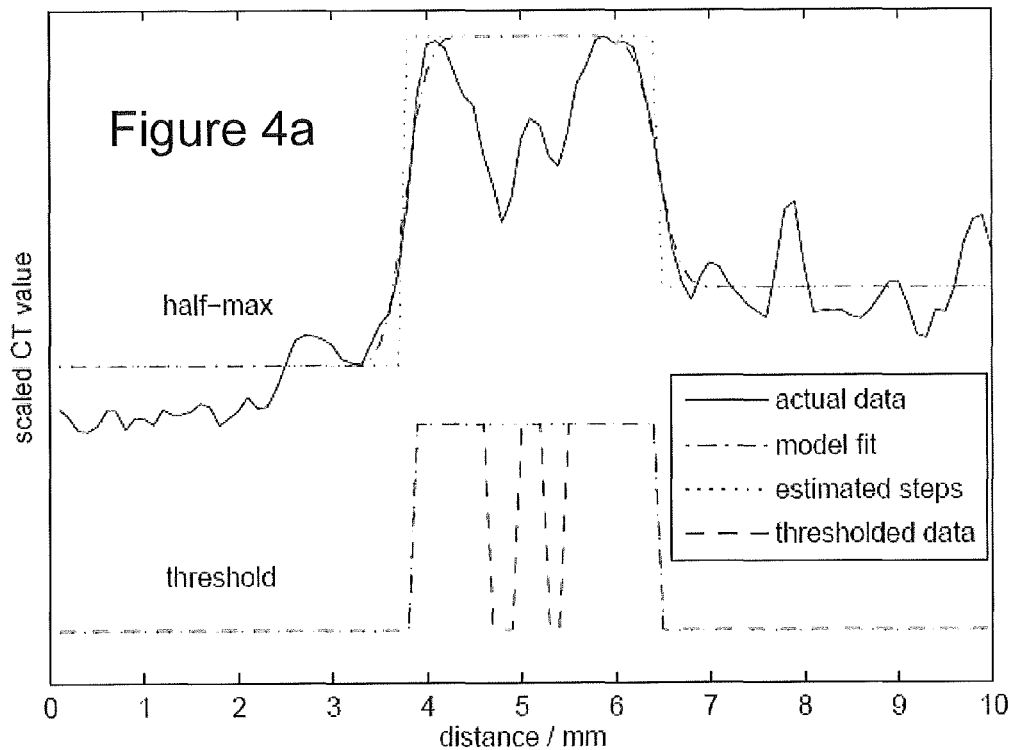
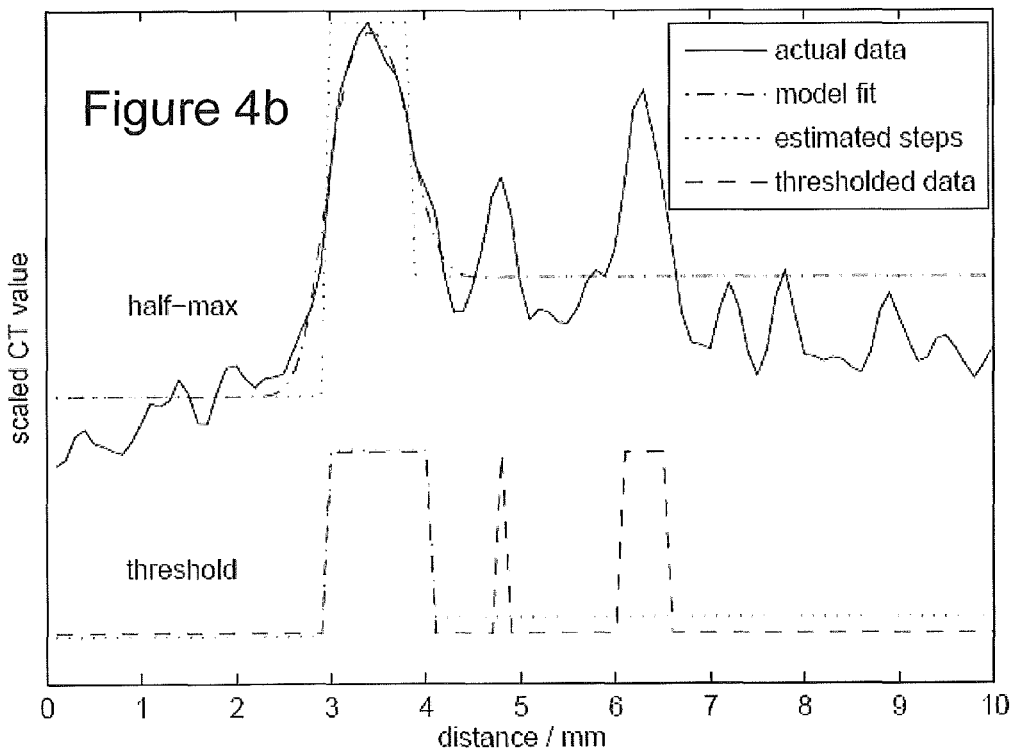

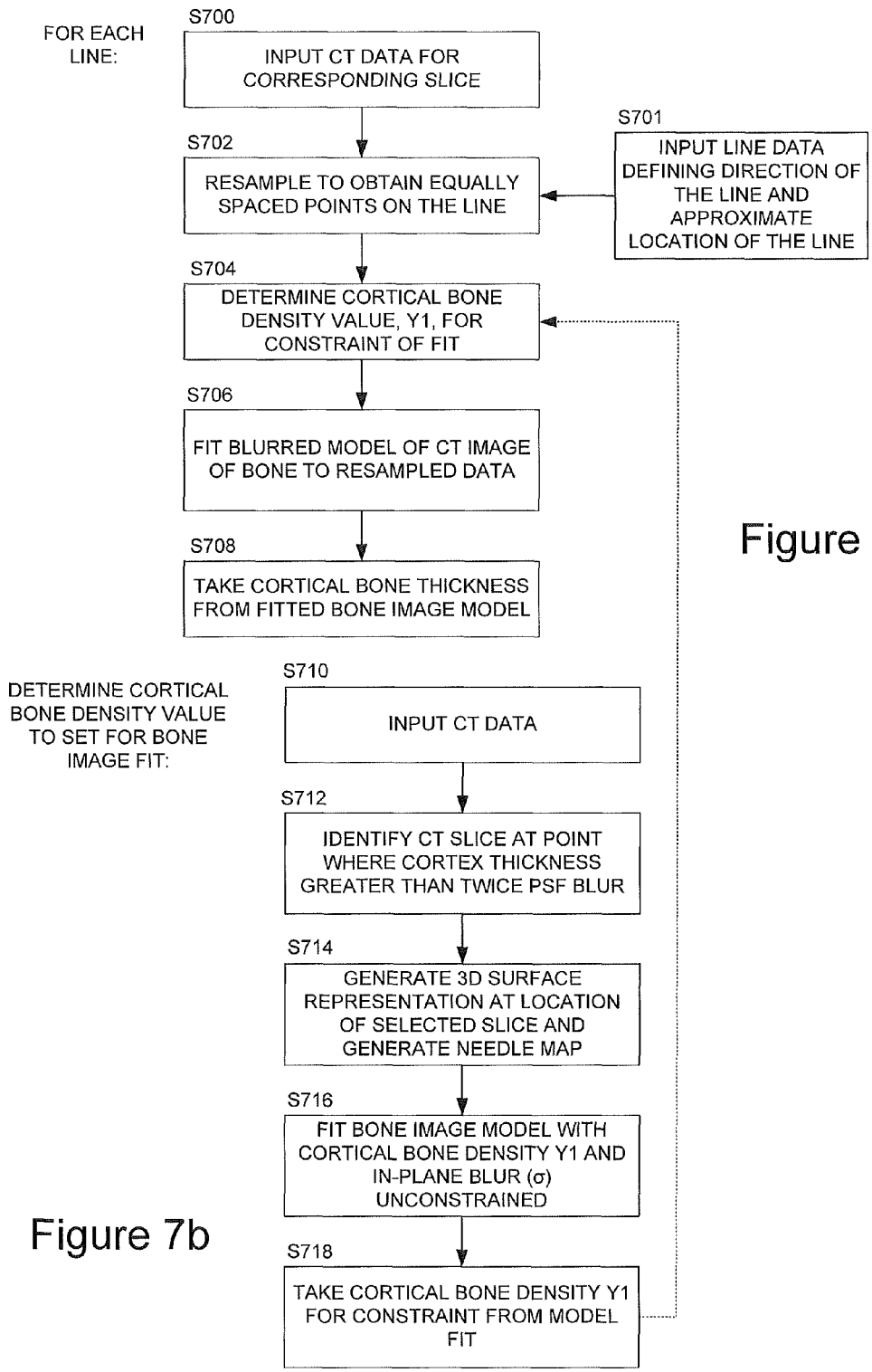

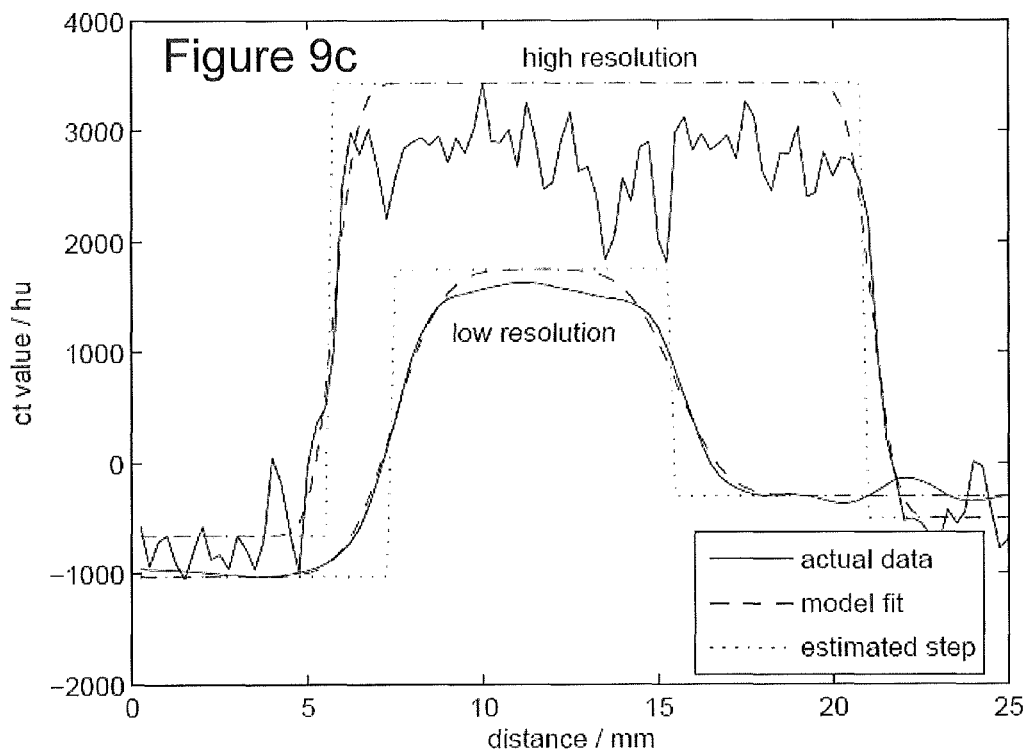
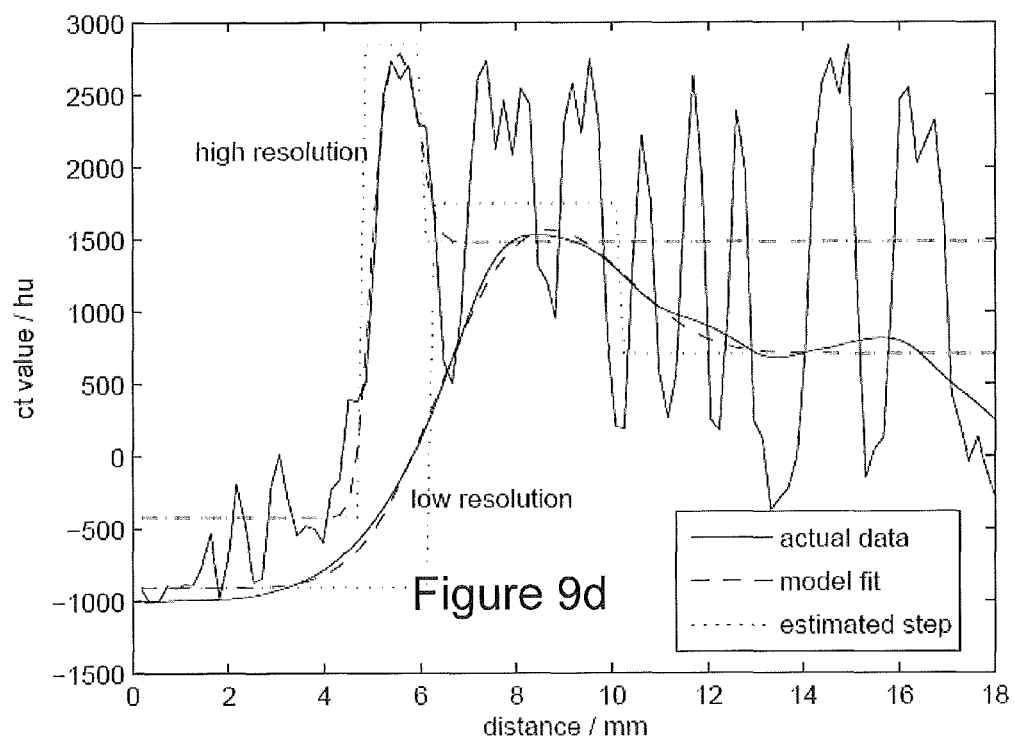

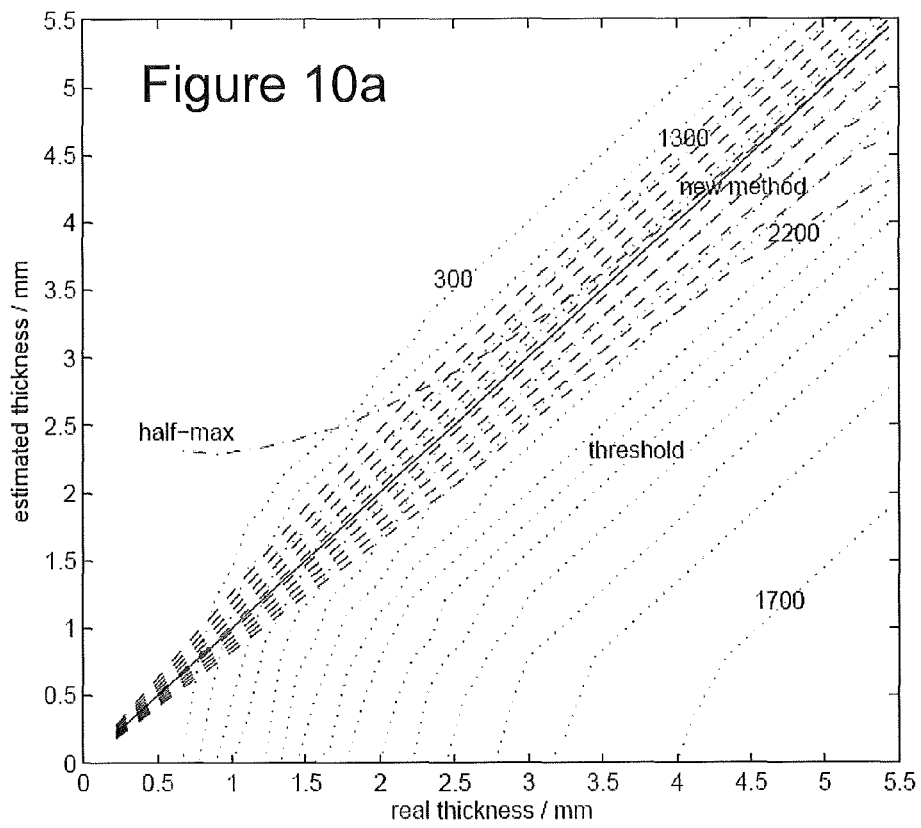
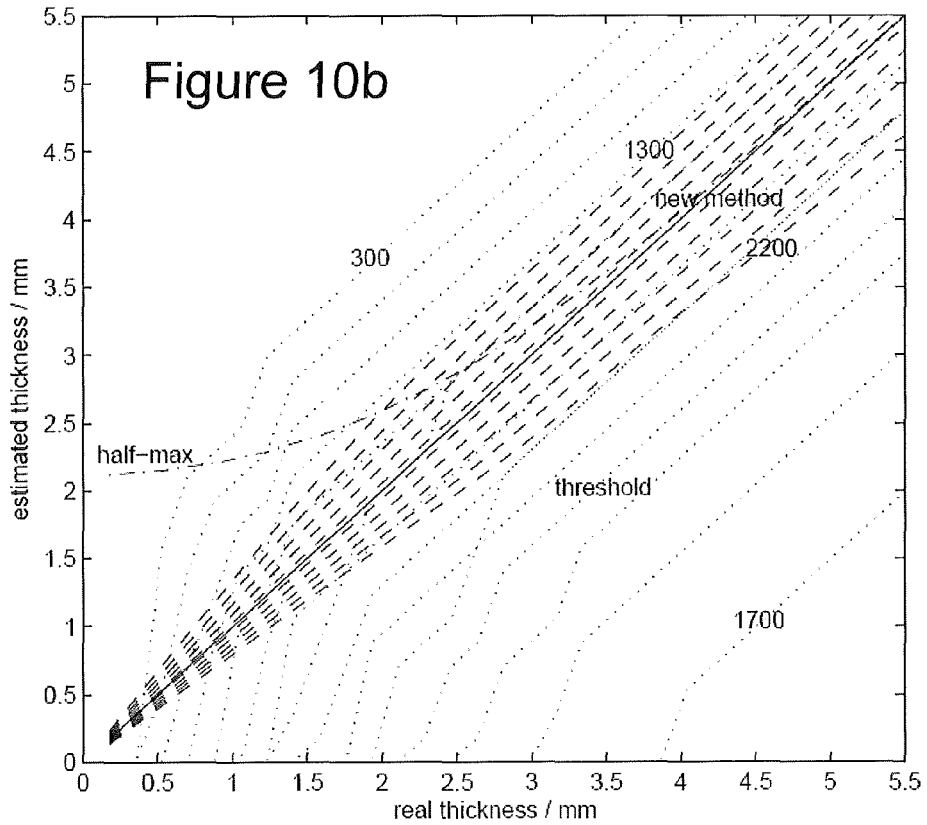

IMAGE DATA PROCESSING SYSTEMS FOR ESTIMATING THE THICKNESS OF HUMAN/ANIMAL TISSUE STRUCTURES

FIELD OF THE INVENTION

This invention relates to methods, apparatus and computer program code for determining the boundaries of and estimating the thickness of human/animal tissue structures, in particular cortical bone.

BACKGROUND TO THE INVENTION

Currently the conventional technique used to evaluate bone mineral density and therefore risk of fragility fracture is a DXA scan (dual energy X-ray absorptiometry). However, DXA alone cannot accurately predict an individual's risk of osteoporotic fracture. Broadly speaking bone comprises a dense outer layer of so-called cortical bone, within which is found trabecular bone, which has a more spongy structure and which is more porous. The outer, cortical bone is the most important in conferring resistance to fracture/breakage and improved techniques for investigating the thickness of this structure would be useful, particularly as exercise/drugs can be used to improve bone strength. General background prior art can be found in: GB2379113A, WO2004/086972, and WO2005/091222.

The exponential increase in hip fractures with ageing imposes a substantial and increasing health burden. They are the most common reason for acute orthopaedic admission in older people and their incidence is projected to rise worldwide from 1.7 million in 1990 to 6.3 million in 2050. Current imaging methods for predicting an individual's hip fracture risk use bone mineral density (BMD) estimates which are specific but have low sensitivity. Regional structural weakness in the aged hip may be causal over and above the risk of falls and there have been numerous calls to develop novel three-dimensional (3D) methods of assessing hip structure, most notably with multi-detector computed tomography, MDCT.

The anatomical distribution of cortical bone in the aged proximal femoral metaphysis is critical in determining its resistance to fracture, with trabecular bone playing a lesser role. Compressive cracking of cortical bone of the superior trochanteric fossa and neck is often the first stage of fracture. Current MDCT studies are anatomically limited by set regions of interest and technically limited by thresholding errors caused by relatively low resolution data sets. Ideally, we would like to be able to map the cortical bone thickness to a high degree of accuracy, from a clinical resolution data set, over the entire proximal femur. Since bone anabolic drugs are capable of stimulating new bone formation at structurally important sites, such a technique might help not only with identification of weak areas but also in assessing treatment response.

Thin laminar structures such as the femoral cortex are not accurately depicted in clinical CT because of the images' limited spatial resolution. This typically results in an underestimate of density and an overestimate of thickness. A number of studies have investigated the influence of the imaging system's in-plane point spread function (PSF), while Prevrhal et al [Prevrhal, S., Fox, J. C. Shepherd, J. A., Gennant, H. K., January 2003, Accuracy of CT-based thickness measurement of thin structures: Modelling of limited spatial resolution in all three dimensions, Medical Physics 30(10, 1-8] go further in quantifying the effects of the out-of-plane PSF as well. Such studies explain why straightforward thickness estimation techniques, such as those based on thresholding or the 50% relative threshold method, are unreliable when the structure is thin compared with the imaging system's PSF. The consensus is that, with typical PSFs from normal bore, clinical CT scanners, straightforward thickness measurements start to become inaccurate below around 2.5 mm, with errors exceeding 100% for sub-millimeter cortices.

More sophisticated thickness estimation techniques are capable of superior accuracy and precision. The classical approach to image deblurring is to assume models of both the object being scanned and the image formation process, then attempt to fit these models to the data. Often, this inverse problem is ill-posed, in that no unique set of model parameters explains the data, especially in the presence of imaging noise. In such circumstances, prior knowledge may be used to constrain some of the model parameters. Such an approach was used by Streekstra et al [Streekstra, G. J., Strackee, S. D., Maas, M., ter Wee, R Venema, H. W., September 2007, Model-based cartilage thickness measurement in the submillimeter range, Medical Physics 34 (9), 3562-3570] to estimate the thickness of cartilage layers in the sub-millimeter range, well below the nominal width of the CT system's PSF. In this instance, the model parameters relating to the PSF were fixed, using information obtained by scanning a suitable phantom.

A typical CT slice has a thickness of order 3 mm; typical in-plane blur is of order 1.5-2 mm (Gaussian full width at half maximum). The thresholding type techniques described above for cortical thickness estimation work well when the cortical thickness is large, for example, 6-7 mm, but do not work well for cortical bone thickness in the range 0-3 mm. However risk of fracture is typically associated with a cortical bone thickness of less than 2 mm.

There is therefore a need for improved techniques for estimating the thickness of a tissue structure in particular cortical bone from tomographic imaging data. Work on this problem has produced some surprising results.

SUMMARY OF THE INVENTION

According to a first aspect of the invention there is therefore provided a method of determining data defining an estimate of the thickness of a tissue structure from tomographic imaging data, the method comprising: inputting a tomographic imaging data set defining at least one slice through a region of tissue including said tissue structure; modelling said tissue structure as a variation of an imaging parameter of said imaging data along a line crossing said tissue structure, a tissue structure model defined by said variation having at least a first tissue modelling parameter defining a value of said imaging parameter along said line and within said tissue structure and having at least one parameter defining said thickness of said tissue structure; modelling a variation of said tomographic imaging data along said line as a blurred version of said variation of said imaging parameter modelling said tissue structure to provide a blurred tomographic imaging model, said blurred version of said variation of said imaging parameter being defined by a blurring function applied to said tissue structure model, wherein said blurred tomographic imaging model has a blurring parameter representing a degree of blurring applied by said blurring function; determining a constraining value of said first tissue modelling parameter; and fitting said blurred tomographic imaging model defining said blurred version of said variation of said imaging parameter along said line, to data derived from said tomographic imaging data set; wherein said fitting comprises holding said first tissue modelling parameter substantially at said constraining value and allowing variation of said blurring parameter and said at least one parameter defining said thickness of said tissue structure to determine said at least one parameter defining said thickness of said tissue structure; and wherein said at least one parameter defining said thickness of said tissue structure comprises said data defining said estimate of said thickness of said tissue structure.

In preferred implementations of the technique X-ray computed tomography is employed, the tissue structure comprises bone, more particularly cortical bone, and the imaging parameter comprises a measure of bone density. CT data values are generally in Hounsfield units, which vary with bone density although are not identical to bone density; quantitative CT may be employed for a more precise measure of bone mineral density (using a phantom in the image to scale the data). Fitting the blurred tomographic imaging model provides data defining locations of edges (boundaries) of the cortical bone which may be used to determine an estimate of the thickness of the cortical bone. However in some applications the location of an inner and/outer edge of the cortical bone may be used without explicitly determining the bone thickness, for example to monitor progressive motion of one or both of these edges over time, for example to track the inner edge to monitor bone remineralisation.

It is not fully understood why fixing the first tissue modelling parameter, (the cortical bone density), provides an improved estimate of cortical bone thickness, especially for thin layers of cortical bone. However from the work we describe later it appears that the estimated cortical bone thickness determined by fitting the model is sensitive to the cortical bone density and less sensitive to the point spread function of the CT apparatus—similar (density×thickness) products (see later) can be obtained with a narrow, high density peak with substantial blurring and with a wider, lower density peak with less blurring. In a sense the modelled data contains a product of cortical bone density and thickness, and by constraining one of these the two variables are effectively mapped to a single useful result, the thickness (in practice the thickness rather than the cortical bone density varies the most). The data that we present later demonstrates that it is better to assume a value for the cortical bone density (step height) rather than to try to fit this, although in preferred embodiments the density of the tissue to either side of the cortical bone in the model is allowed to vary so that these are fitted parameters.

The data that we present also demonstrates that the average error of the procedure we describe is almost zero, which means that there is substantially no bias in the estimated thickness. This is surprising as one might expect that assuming a cortical bone density of, say, 2000 HU would impart a systematic error to the estimated thickness. However it turns out that this is not the case and, moreover, the variance of the technique we describe improves as the estimated thickness becomes thinner, perhaps because there is less dependence on an accurate constraint on the cortical bone density value if the thickness is small. A further advantage of the techniques that we describe is that they work for very thin cortical bone thicknesses, whereas other techniques, for example simple thresholding, can fail entirely for thin structures.

Some additional advantages of the above described techniques are that no measurement of the point spread function of the tomographic imaging apparatus is required, thus dispensing with a calibration step. The technique also works well with very poor tomographic data since, if necessary, blurring can be deliberately added to the tomographic image data, for example by applying a noise-reduction filter. In this event the above described technique automatically takes account of this blurring. In effect an accurate estimation of the cortical bone thickness can still be obtained, albeit at the expense of being able to derive fewer thickness measurements over the surface of the bone (a loss in spatial resolution over the surface of the bone for a thickness estimate). This advantage is important as it facilitates widespread application of the techniques we describe rather than their being restricted only to hospitals with recent high resolution CT equipment.

In preferred implementations the tissue structure model has second and third tissue modelling parameters defining values of the imaging parameter in the tissue to either side of the structure whose edges (boundaries) are being located. These may comprise, for example, a base line tissue density and a trabecular bone tissue density. In preferred embodiments one or both these modelling parameters are allowed to vary, though potentially one or both could be constrained.

The above described technique may be extended to determine 3 or more edges (boundaries) within the imaged tissue, by employing a tissue structure model with two or more modelled layers of tissue whose modelling parameters (densities) are constrained. For example a two-step model may be employed to model a structure comprising a layer of cortical bone adjacent a layer of cartilage, constraining the cortical bone density and cartilage density and, for example, allowing the outer tissue density and trabecular bone density to vary. Thus the locations of the edges (boundaries) between each layer of tissue can be determined, for example the edges of the cartilage and the edges of the cortical bone (in embodiments where one edge of the cartilage is at substantially the same position as one edge of the cortical bone).

In embodiments of the above described technique the line along which the tissue structure is modelled lies out of a plane defined by a slice of the tomographic imaging data. Within the CT tomographic imaging data the data is organised such that it is possible to identify data corresponding to a slice or plane defined by an imaging plane of the CT apparatus: the skilled person will be aware that tomographic, more particularly CT images are captured as a set of planes or slices, albeit the captured data may thereafter be presented to provide different representations of a captured 3D image). In embodiments, therefore, the blurring parameter comprises an in-plane blurring parameter defining a degree of blurring in the plane of the slice, and the blurred tomographic imaging model further comprises an out-of-plane blurring parameter defining a degree of blurring dependent on an angle between the line, which is normal to a cross-section of the tissue structure, and he plane of the slice. Preferably the direction of the line is substantially normal to the cortical surface where it crosses the surface (and thus in general it will not be normal to the CT slice). In embodiments this angle is determined (for example from the imaging data, as described later), and the out-of-plane blurring parameter can then be constrained dependent on this angle during the fitting of the blurred tomographic imaging model. In practice, however, because both the in-plane and out-of-plane blurring may be modelled by a gaussian function, because the in-plane blurring is not constrained this variable parameter can, in effect, take account both in-plane and out-of-plane blurring.

As mentioned, in embodiments the line crossing the tissue structure along which the tissue structure model is defined is a line normal to a surface of the tissue structure (cortical bone); the direction of this surface normal may be determined by a range of techniques. However it is not essential that the line is normal to the surface because, for example, one or more thickness estimates could be determined in the plane of a CT slice and used, medically, with an inherent scaling factor (t cos a). For example, a standard slice orientation could be employed and estimated thickness values measured, quoted or otherwise used for this slice (which may or may not be orientated so that it cuts the cortical bone perpendicularly). In such a case, however, it is still preferable that the line is orientated so that, in the plane of the slice, it is perpendicular to the edge of the slice (i.e. when the slice is viewed the line should cross the layer of tissue at right angles). In a still further alternative approach rather than effectively projecting the line onto a plane of a slice defined by the CT data, image data for points along the line may be read in 3-D from a 3-dimensional CT image data set, although this is less preferable because the blurring will be non-uniform. As the skilled person will understand, in general tomographic imaging apparatus such as CT apparatus captures a series of 2-dimensional image slices (with a common axis) which are assembled to create the impression of a 3-D image. Preferably, therefore, the blurring is modelled based on planes or slices of data corresponding to those used when physically acquiring the image, in order that the blurring can be accurately modelled.

In some preferred embodiments of the method a surface of the tissue structure, more particularly a 3-D outer surface of the cortical bone, is identified from the tomographic imaging data set and used to identify one, or more preferably a plurality, of surface normals to this surface. The line along which the blurred tomographic imaging model is defined is then aligned along a direction of this surface normal, either manually or automatically. In embodiments a needle map of the surface is determined and the blurred tomographic imaging model is fitted along lines defined by each surface normal to determine a plurality of thickness estimates (or locations of the inner and/or outer edge of the cortical bone). This information may then be stored or output, for example, as a map showing the estimated thickness variation over the surface of the tissue structure (bone). The fit of the 3-D outer surface of the tissue structure need not be particularly accurate as it is merely employed to identify a surface normal and an associated vertex in 3-D. Since the imaging data is also 3-D it is straightforward to identify the nearest slice and the orientation of this surface normal with respect to the plane of the slice.

Displaying a thickness map as a 3-D representation of the outer surface of the cortical bone painted with a colour (or greyscale and/or with a pattern) to represent variation of the estimated thickness over this surface is particularly advantageous as it facilitates rapid identification of potentially significant (weak) regions.

Although preferred embodiments of the technique employ CT image data and a tissue structure model of a layer of cortical bone, embodiments of the technique are not limited to this. Embodiments may potentially be employed where the tissue structure model relates to any layer or sheet of tissue and defines a substantially constant value of the first tissue modelling parameter along a line crossing this layer or sheet (preferably at right angles), such that the model assumes a substantially constant value of this first tissue modelling parameter within the thickness of the layer or sheet of tissue. Thus, for example, embodiments of the technique may be extended to cartilage. Where an alternative tomographic imaging technique is employed, for example, magnetic resonance imaging, the thickness of a layer or sheet of soft tissue may be determined, for example the thickness of an arterial wall. When employed in determining the thickness of cortical bone embodiments of the technique are particularly useful when imaging the proximal femur, for example to identify risk of fracture due to osteoporosis. However, embodiments of the technique may also be employed to image cortical bone thickness in other regions of a living or dead human or animal body, for example the spine. In general the technique works best when the tissue in the vicinity of the modelled tissue structure is relatively homogenous.

The invention further provides a carrier carrying processor control code to implement the above-described methods, for example on a general purpose computer system or on a digital signal processor (DSP). The carrier may comprise, for example, a disk such as a CD- or DVD-ROM or programmed memory such as read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

In a related aspect the invention provides tissue structure thickness estimation apparatus for determining data defining an estimate of the thickness of a tissue structure from tomographic imaging data, the apparatus comprising: an input for inputting a tomographic imaging data set defining at least one slice through a region of tissue including said tissue structure; working memory for storing data; program memory storing processor control code; and a processor coupled to said input, to said working memory, and to said program memory; and wherein said stored processor control code comprises code to: model said tissue structure as a variation of an imaging parameter of said imaging data along a line crossing said tissue structure, a tissue structure model defined by said variation having at least a first tissue modelling parameter defining a value of said imaging parameter along said line and within said tissue structure and having at least one parameter defining said thickness of said tissue structure; model a variation of said tomographic imaging data along said line as a blurred version of said variation of said imaging parameter modelling said tissue structure to provide a blurred tomographic imaging model, said blurred version of said variation of said imaging parameter being defined by a blurring function applied to said tissue structure model, wherein said blurred tomographic imaging model has a blurring parameter representing a degree of blurring applied by said blurring function; determine a constraining value of said first tissue modelling parameter; and said blurred tomographic imaging model defining said blurred version of said variation of said imaging parameter along said line, to data derived from said tomographic imaging data set; wherein said fitting comprises holding said first tissue modelling parameter substantially at said constraining value and allowing variation of said blurring parameter and said at least one parameter defining said thickness of said tissue structure to determine said at least one parameter defining said thickness of said tissue structure; and wherein said at least one parameter defining said thickness of said tissue structure comprises said data defining said estimate of said thickness of said tissue structure.

As previously mentioned, the data from fitting the model may be employed to determine one or more of: an estimated thickness of the tissue structure, the location of an inner edge of the tissue structure, and a location of an outer edge of the tissue structure. This information may be stored, or output, or displayed, or otherwise further electronically processed.

In a further related aspect the invention provides a method of estimating the position of an edge of or the thickness of cortical bone from CT data, the method comprising: modelling a CT image of said cortical bone using a piecewise constant bone density model blurred by a CT imaging blurring function; fitting said CT data to said modelled blurred CT image by allowing said blurring function to vary whilst constraining a value of cortical bone density represented by said bone density model to be substantially fixed; and estimating said position of said edge or said thickness of said cortical bone from a parameter of said fitted model.

In embodiments the blurring function comprises a point spread function. Optionally a piecewise linear bone density model may be employed instead of a piecewise constant bone density model. In preferred embodiments the technique is used to estimate the cortical bone thickness at a plurality of positions around a 2-D perimeter or over a 3-D surface of the cortical bone, and this information is then graphically displayed to a user.

The invention further provides processor control code on a carrier such as a disc or programmed memory (as mentioned above) configured to implement such a method.

The invention also provides apparatus for estimating the position of an edge of or the thickness of cortical bone from CT data, the apparatus comprising: working memory for storing data; program memory storing processor control code; and a processor coupled to said input, to said working memory, and to said program memory; and wherein said stored processor control code comprises code to: model a CT image of said cortical bone using a piecewise constant bone density model blurred by a CT imaging blurring function; fit said CT data to said modelled blurred CT image by allowing said blurring function to vary whilst constraining a value of cortical bone density represented by said bone density model to be substantially fixed; and estimate said position of said edge or said thickness of said cortical bone from a parameter of said fitted model.

In a further aspect the invention provides a method of providing a representation of cortical bone thickness from CT data, the method comprising: inputting CT image data of said cortical bone; generating a 2-D or 3-D needle map of an outer perimeter or surface of said cortical bone, said needle map defining a plurality of perimeter normals or surface normals to said cortical bone at a plurality of respective portions on said outer perimeter or surface; determining a thickness estimate of said cortical bone at each of said positions along a direction of a respective said perimeter normal or surface normal for the position; and generating mapping data representing a 2-D or 3-D map defining said estimated cortical thickness at each of said plurality of positions overlaid on a respective 2-D representation of said perimeter or 3-D representation of said surface of said cortical bone.

Embodiments of the above described cortical bone thickness estimation technique are particularly useful in such a method as they provide a substantially unbiased measure of cortical bone thickness (in the sense that there is substantially no systematic error to indicate the thickness as greater than or less than the real thickness). In preferred implementations of the method the data is displayed graphically as a 2-D or 3-D representation with the estimated thickness mapped onto the 2-D or 3-D surface of the cortical bone. This enables risk-associated changes in thickness to be identified when this would otherwise be difficult The invention also provides apparatus for providing a representation of cortical bone thickness from CT data, the apparatus comprising: working memory for storing data; program memory storing processor control code; and a processor coupled to said input, to said working memory, and to said program memory; and wherein said stored processor control code comprises code to: input CT image data of said cortical bone; generate a 2-D or 3-D needle map of an outer perimeter or surface of said cortical bone, said needle map defining a plurality of perimeter normals or surface normals to said cortical bone at a plurality of respective portions on said outer perimeter or surface; determine a thickness estimate of said cortical bone at each of said positions along a direction of a respective said perimeter normal or surface normal for the position; and generate mapping data representing a 2-D or 3-D map defining said estimated cortical thickness at each of said plurality of position overlaid on a respective 2-D representation of said perimeter or 3-D representation of said surface of said cortical bone.

In embodiments the apparatus may comprise a suitably programmed computer system including a network connection, display screen and non-volatile storage.

BRIEF DESCRIPTION OF THE DRAWINGS

These and other aspects of the invention will now be further described, by way of example only, with reference to the accompanying figures in which:

FIG. 2 shows a simulation of the cortical imaging process. The CT value along a line passing through the cortex is simulated by blurring a piecewise constant density function (with CT values of −1000, 1750 and 0) with a Gaussian kernel of standard deviation 1 mm. The solid lines show the underlying and blurred CT values, the dotted lines show a threshold of 600, and the dashed lines show values halfway between the appropriate (adjacent) CT baseline and the blurred peak (50% relative threshold). In (a), the cortex is sufficiently wide for thresholding and the 50% relative threshold methods to work correctly. In (b), the threshold still gives approximately the correct thickness, but the 50% relative threshold method overestimates. In (c), no values exceed the threshold, and the 50% relative threshold method now reports the width of the PSF rather than that of the cortex.

FIG. 4 shows discrimination of cortical and trabecular bone peaks for the half-max and threshold methods. (a) and (b) are two examples from the high resolution data showing how the model-fitting process establishes which peaks are within the cortex. The upper plots correspond to the half-max method, the lower plots to the threshold method. The model-fitting algorithm optimally (in a least squares sense) divides the data into spans of higher (cortical) and lower (trabecular, exterior) density values. For the half-max method, the boundaries tend to be positioned very close to the half-way point between the cortical and trabecular/exterior values. For the threshold method, the boundaries are positioned precisely on one of the threshold crossing points.

FIGS. 7a to 7e shows, respectively, a flow diagram of a cortical bone thickness estimation procedure, a flow diagram of a procedure for estimating a constraining cortical bone density value for the procedure of FIG. 7a, an example procedure for generating a needle map of surface normals, a procedure for generating a 2-D/3-D perimeter/surface map of estimated cortical bone thickness, and apparatus configured to implement the procedures of FIGS. 7a-7d, all according to a preferred embodiment of the invention.

FIG. 10 shows thickness estimation on simulated data with varying cortical thickness. For a range of cortical thicknesses from 0.2 mm to 5.5 mm, the CT value on a line passing through the cortical layer was simulated by blurring a piecewise constant density function with a Gaussian kernel of standard deviation 1.25 mm. The thickness was then estimated using the half-max method, thresholding at CT values from 300 to 1700, and the new method assuming a cortical CT value ($y_1$) of 1300 to 2200. (a) shows a simulated scan in air (density goes from −1000 to 1750 to 0) and (b) shows an in vivo simulation (density goes from 0 to 1750 to 0). In both cases, the half-max method overestimates at low thicknesses. Thresholding gives better results for carefully chosen thresholds: note how the optimal threshold varies significantly from (a) to (b). The new method gives consistently good results, with relatively little sensitivity to the assumed cortical CT value.

FIG. 14 shows thickness estimation for a patient with a fractured right femur. The maps were produced using the 'new variable' method. (a) and (b) show the fractured and contralateral femurs from the front, (c) and (d) from the back. This demonstrates the feasibility of estimating cortical thickness maps in vivo, even for fractured femurs. The fractured and contralateral maps are reassuringly similar.

DETAILED DESCRIPTION OF EMBODIMENTS

1. Overview

Figure 1:
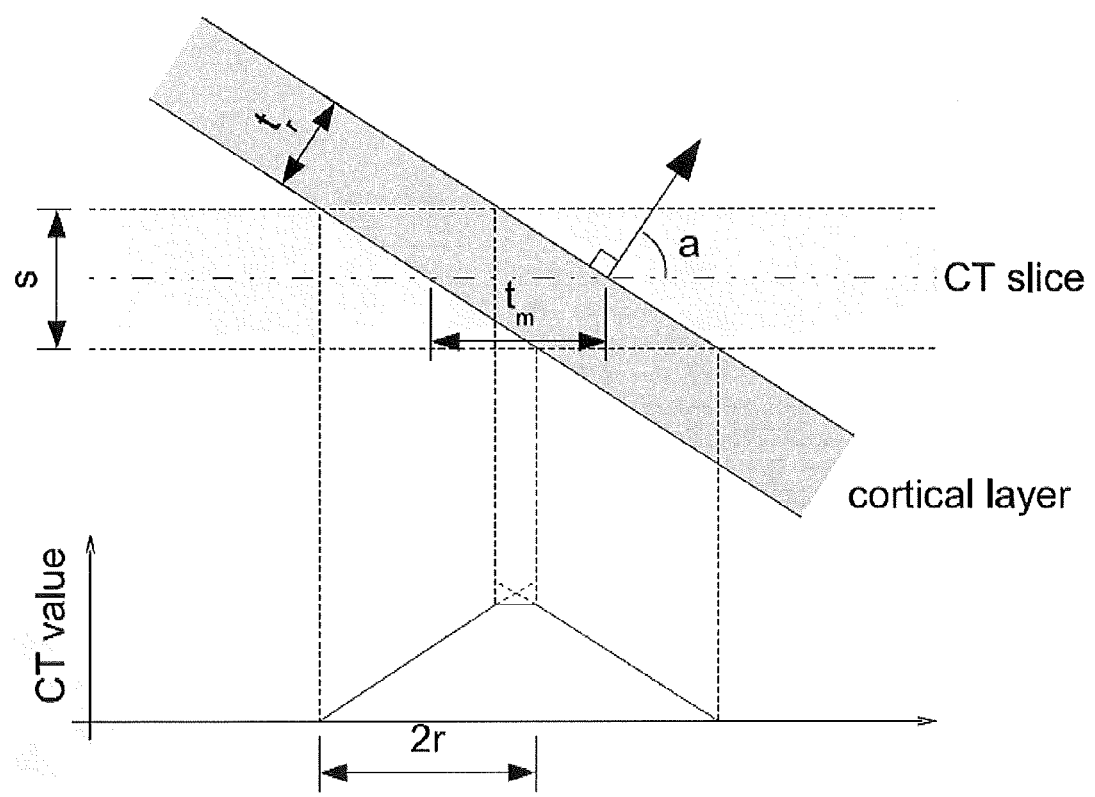
FIG. 1 shows the effect of surface orientation and CT slice thickness on the apparent thickness and out-of-plane plane PSF. A finite CT slice width s causes cortical layers oblique to the slice to appear as if they have been blurred with a rectangular PSF, with extent dependent on surface orientation a, leading to a piecewise linear image. The true cortical thickness $t_r$ can be expressed as a function of a and the measured thickness $t_m$.
Figure 3A:
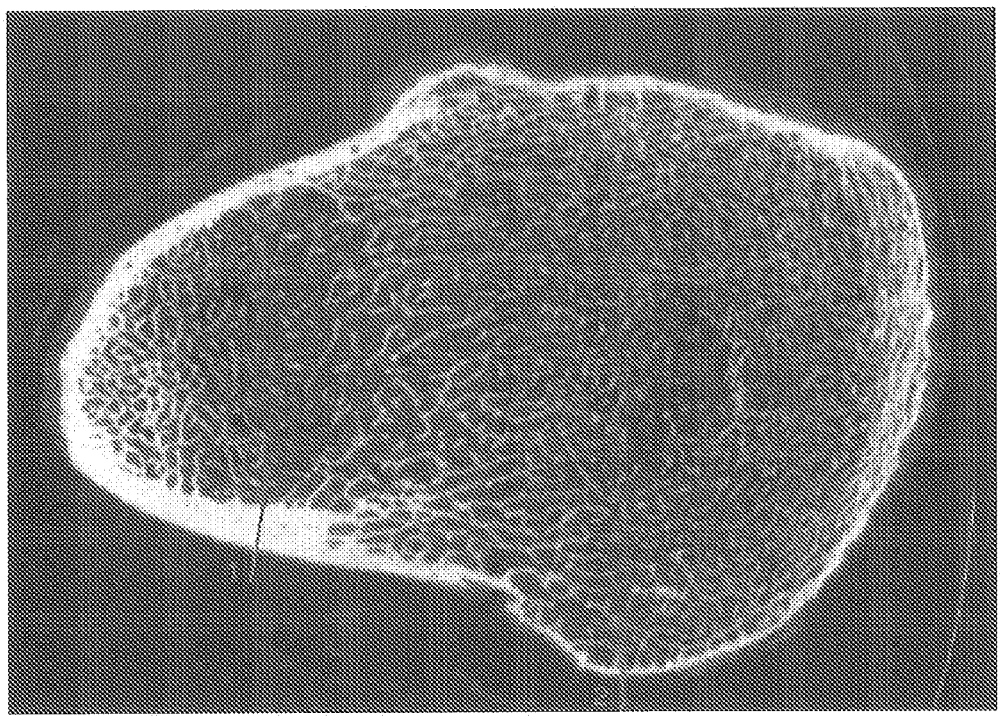
FIG. 3 shows cortical thickness in high and low resolution CT data. (a) and (b) show corresponding CT slices from a cadaveric femur scanned at high resolution (Xtreme pQCT, 82 μm/pixel, Scanco Medical A G, Brüttisellen, Switzerland) and low resolution (Siemens Somatom Sensation 64 MDCT, 589 μm/pixel, Siemens A G, Erlangen, Germany). (c) and (d) show the CT values along the lines labelled (1) and (2) in the images. In (c), the cortical layer is sufficiently thick to show a significant peak in the low resolution data. In (d), the thickness is somewhat less, and in this case there is only a very shallow peak in the low resolution data. Also shown in (c) and (d) are the best fit models $y_{blur}$, and the corresponding piecewise constant density functions.
Figure 3B:
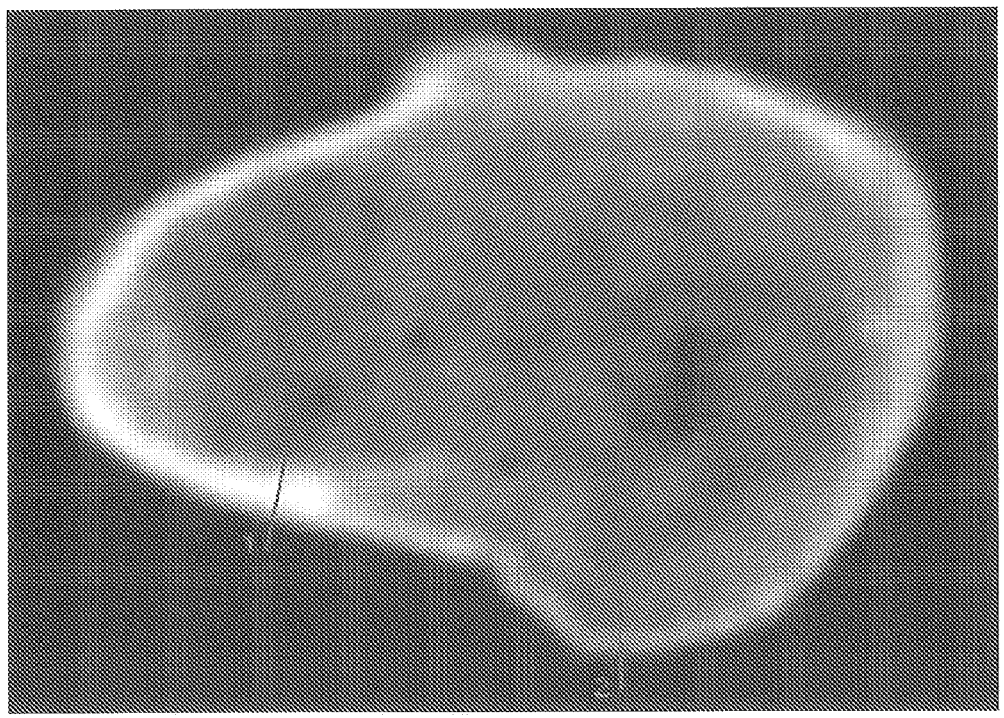
Figure 3C:
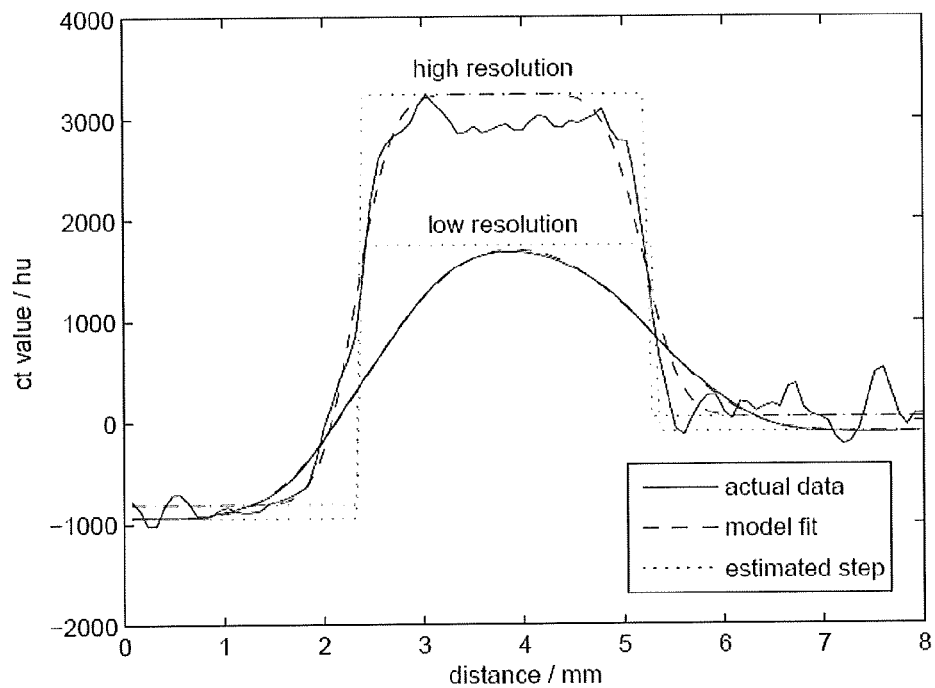
Figure 3D:
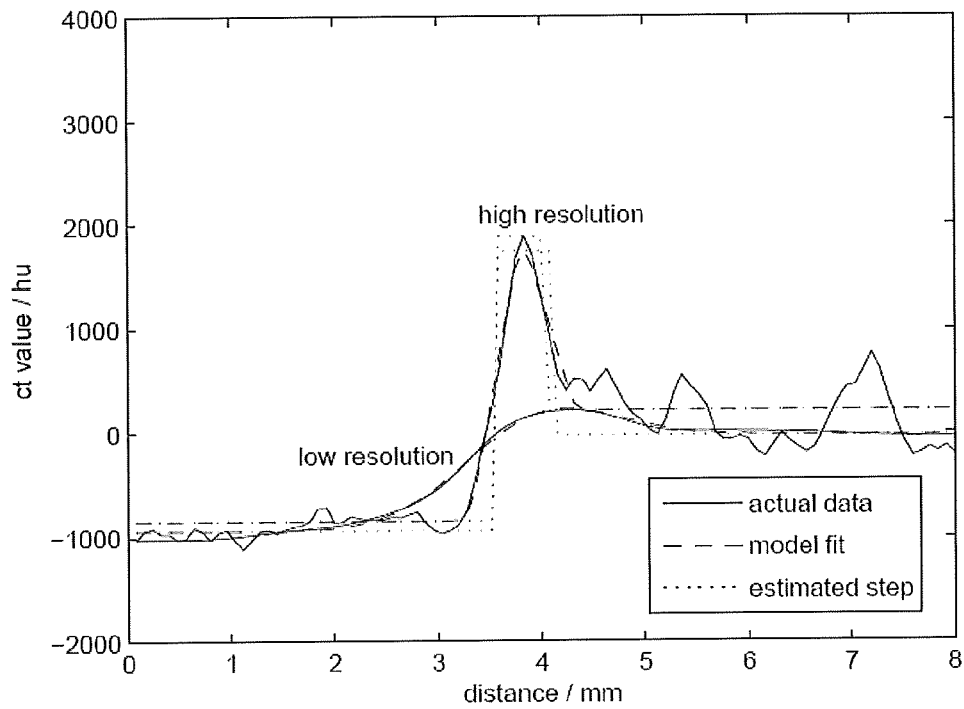

The distribution of cortical bone in the proximal femur is believed to be critical in determining fracture resistance. Current CT technology is limited in its ability to measure cortical thickness, especially in the sub-millimeter range which lies within the point spread function of today's clinical scanners. We will describe a technique that is capable of producing unbiased thickness estimates down to 0.3 mm. In embodiments the technique relies on a mathematical model of the anatomy and the imaging system, which is fitted to the data at a large number of sites around the proximal femur, producing around 17,000 independent thickness estimates per specimen. In a series of experiments on sixteen cadaveric femurs, estimation errors were measured as −0.01±0.58 mm (mean±1 std. dev.) for cortical thicknesses in the range 0.3 mm to 4 mm. This compares with 0.25±0.69 mm for simple thresholding and 0.90±0.92 mm for a variant of the 50% relative threshold method. In the clinically relevant sub-millimeter range, thresholding increasingly fails to detect the cortex at all, whereas the new technique continues to perform well. The many cortical thickness estimates can be displayed as a colour map painted onto the femoral surface. Computation of the surfaces and colour maps is largely automatic, requiring around 15 minutes on a modest laptop computer.

Thus we describe a model-based approach for measuring femoral cortical bone thicknesses in the supra- to sub-millimeter range, using standard, normal bore, clinical CT. Surprisingly we find that constraining the peak CT density, rather than the imaging system's PSF, produces the best cortical thickness estimates. Our model-fitting process is guided by a semi-automatic segmentation of the outer bone surface. This leads to an illuminating way of visualizing the results: cortical thicknesses can be displayed, to high spatial resolution, as a colour map painted on the bone surface.

2.1. Modelling the Scanning Process

We use as our raw data for each cortical thickness estimate the CT values along a line in the imaging plane normal to cross-section of the cortical layer, and of sufficient length to pass through both the cortical layer itself and any blurred prolongation caused by the imaging process. A convenient method for locating such lines is discussed in Section 2.3. We assume that the cortical layer is locally flat and of uniform thickness, at least within the extent of the imaging system's PSF. We can then model the CT values along the line as a convolution of the 'real' density with an in-plane and an out-of-plane PSF. The real density variation y over distance x is assumed to be piecewise constant, with different values in the surrounding tissue, the cortex and the trabecular bone. This can be expressed as the summation of two step functions:

$$y(x) = y_0 + (y_1 - y_0)H(x - x_0) + (y_2 - y_1)H(x - x_1) \quad (1)$$

where $y_0$, $y_1$ and $y_2$ are the CT values in the surrounding tissue, cortical and trabecular bone, respectively, $x_0$ and $x_1$ are the locations of the outer and inner cortical surfaces, and $H(x)$ is a unit step function.

Following the approach taken by Prevrhal et al., (2003), ibid, we model the in-plane PSF $g_i$ as a normalised Gaussian function:

$$g_i(x) = \frac{e^{-\frac{x^2}{\sigma^2}}}{\sigma\sqrt{\pi}} \quad (2)$$

where $\sigma$ represents the extent of the blur. The out-of-plane PSF $g_o$ is the result of the interaction between the CT slice thickness and the orientation of the cortical layer with respect to the imaging plane, as illustrated in FIG. 1. This can be expressed as a rectangular function:

$$g_o(x) = \frac{1}{2r}[H(x+r) - H(x-r)] \quad (3)$$

where the extent of blur 2r is calculated from s, the CT slice thickness, and a, the angle the cortical surface normal makes with the imaging plane:

$$r = \frac{s}{2}\tan a \quad (4)$$

Hence, the fully blurred CT values $y_{blur}$ are given by equation (5) below. These expressions are readily derived by differentiating y(x) and $g_o(x)$ to obtain a sequence of δ-functions, convolving with $g_i(x)$, and integrating the result; $y_{blur}$ can then be evaluated by numerical integration of eq. (5) or (6), which is more computationally efficient than the alternative approach of direct numerical convolution. This is particularly advantageous when $y_{blur}$ is evaluated a large number of times, as in the Levenberg-Marquardt procedure described in Section 2.2.)

$$y_{blur}(x) = y_0 + \int \left( \frac{y_1 - y_0}{2r\sigma\sqrt{\pi}} \left[ e^{-\frac{(x+r-x_0)^2}{\sigma^2}} - e^{-\frac{(x-r-x_0)^2}{\sigma^2}} \right] + \frac{y_2 - y_1}{2r\sigma\sqrt{\pi}} \left[ e^{-\frac{(x+r-x_1)^2}{\sigma^2}} - e^{-\frac{(x-r-x_1)^2}{\sigma^2}} \right] \right) dx\,dx \quad (5)$$

except for the special case r=0, when:

$$y_{blur,r=0}(x) = y_0 + \int \left( \frac{y_1 - y_0}{\sigma\sqrt{\pi}} e^{-\frac{(x-x_0)^2}{\sigma^2}} + \frac{y_2 - y_1}{\sigma\sqrt{\pi}} e^{-\frac{(x-x_1)^2}{\sigma^2}} \right) dx \quad (6)$$

The true cortical thickness $t_r$ is then:

$$t_r = t_m \cos a = (x_1 - x_0)\cos a \quad (7)$$

Here $t_m = x_1 - x_0$; $t_m$ comes from fitting the model. FIG. 2 shows $y_{blur}$ for the case σ=1 mm and r=0, and with cortical thickness values of 5 mm, 1 mm and 0.5 mm. When the cortex is thin, as in FIG. 2(c), thickness estimation using a set threshold, or the 50% relative threshold method, is highly error prone. Prevrhal et al (2003) demonstrated that eq. (5) is a good model for what is typically observed when estimating cortical thickness in practice. The real examples in FIG. 3 confirm that the imaging process for low resolution clinical data does indeed follow the model fairly closely. The equivalent high resolution data indicates that the 'real' density variation is reasonably well modelled by the piecewise constant function of eq. (1), though clearly the CT values on either side of the cortex are not perfectly flat.

2.2. Thickness Estimation

If we could fit the model of eq. (5) to real CT data, then we could derive the cortical thickness $t_r$ using eq. (7) and knowledge of the surface orientation. This potentially allows thickness measurement well below the blurring level σ of the imaging process. Fitted models are shown as dashed lines in FIGS. 3(c) and (d). For the high resolution data, the dashed lines follows the edges of the cortex well, despite the distracting density variations elsewhere. For the low resolution data, the dashed lines are nearly indistinguishable from the real data (solid lines), providing further evidence of the model's validity.

In our proposed method, optimization of the model parameters is performed using, for example, the standard Levenberg-Marquardt method [More, J. J., 1977, The Levenberg-Marquardt algorithm: Implementation and theory, in: Watson, A. (Ed.), Numerical Analysis. Lecture Notes in Mathematics 630, Springer-Verlag, pp. 105-116]. The CT data is resampled at 100 points along the line in the image plane normal to the cortical surface, using the Mitchell-Netravali cubic spline [Burger, W., Burge, M. J., 2009, Principles of Digital Image Processing: Core Algorithms. Springer-Verlag] to interpolate between the original CT samples. Automatic positioning of this line is discussed in Section 2.3. The skilled person will appreciate that many alternatives to the referenced examples exist; preferably a cubic B-spline is used for interpolation. The model is then fitted to the 100 new samples, with eq. (5) evaluated numerically for each candidate set of parameters. Model-data discrepancies at one end of the line (that closest to the outer cortical surface) are penalised slightly more than discrepancies elsewhere. This encourages the optimization algorithm to fit the model to the actual cortex, and not to secondary CT peaks within the interior that are especially common in high resolution data.

There are seven model parameters in total, ($y_0$, $y_1$, $y_2$, $x_0$, $x_1$, $\sigma$, r). Of these, the out-of-plane blur r is assumed to be known from the surface orientation (see Section 2.3) and the slice thickness, following eq. (4). The edges of the cortical layer ($x_0$, $x_1$) are the values we are attempting to estimate. This leaves three parameters ($y_0$, $y_1$, $y_2$) describing the CT values, and one, $\sigma$, describing the in-plane PSF. The CT values of the surrounding tissue ($y_0$) and of the trabecular bone ($y_2$) vary with location around the proximal femur, so we leave the model free to discover these parameters for each individual line. This requires that the line penetrates each region sufficiently: we therefore set the line length to at least three times the maximum cortical thickness we expect to encounter, and position it so that one third lies outside the exterior cortical surface. For the experiments reported in Section 3, the line length was about 18 mm in all cases (6 mm outside, 12 mm inside).

The remaining two model parameters, $y_1$, the cortical CT value, and $\sigma$, the in-plane blur, are more problematic. For thin cortical layers, it is possible to trade one off against the other to produce values of $y_{blur}$ that are very similar. In other words, the problem is ill-posed. When both these parameters are left free, the Levenberg-Marquardt method frequently fails to converge, and there is much variability in the subsequent thickness estimates. To better condition the optimization problem, we could constrain either $\sigma$, or $y_1$. Neither choice is ideal, since both $\sigma$ and $y_1$ are expected to vary with location around the proximal femur. While it might seem more natural to constrain $\sigma$, it transpires that this barely improves the conditioning of the problem. In contrast, constraining $y_1$ is far more effective. The evidence for this assertion can be found in Section 3, where we subsequently assess two approaches for setting $y_1$ (a fixed value for all data, or automatically estimating a value for each femur), and establish how sensitive the thickness estimates are to errors in $y_1$.

For comparison, we also tested thresholding, with levels as in [Poole, K. E. S., Rose, C. M., Mayhew, P. M., Brown, J., Clement, J. G., Thomas, C., Reeve, J., Loveridge, N., 2008, Thresholds for the measurement of cortical thickness in-vivo using computed tomography (the 100 women study), Calcified Tissue International 83(1), 33], and a method similar to the 50% relative threshold of Prevrhal et al., 1999 [Prevrhal, S., Engelke, K., Kalander, W. A., March 1999. Accuracy limits for the determination of cortical width and density: the influence of object size and CT imaging parameters, Physics in Medicine and Biology 44(3), 751-764]. For a fair comparison at equivalent resolutions, all methods used the same 100 sampled CT points. Additionally, our implementations of the various methods all involve fitting the model to the data in one way or another: this ensures consistent discrimination between CT peaks considered to be in the cortex and those considered to be in the trabecular bone. In general, the low resolution data exhibits just a single peak along the length of the line, but the high resolution data resolves smaller features, including intra-cortical pores, leading to multiple peaks. In such circumstances, the model fitting algorithm implicitly determines which peaks lie within the cortex, as illustrated in FIG. 3 for the new method and in FIG. 4 for the comparison methods. Although they share this same methodology for cortical peak identification, the various methods otherwise differ in many respects:

threshold The sampled data is first converted to binary form using the threshold: values above the threshold are set to one, those below are set to zero. Both r and $\sigma$ are fixed at zero, and $y_1$ is set to one. The model-fitting process then determines which peak or peaks are considered to be cortex: $x_0$ and $x_1$ are exactly aligned with 0-1 transitions in the binary data, as in FIG. 4, and these are taken to be the cortical edges. The chosen threshold was constant over all data sets scanned in the same way with the same scanner, corresponding to approximately 430 mg/cm$^2$ area BMD.

half-max $y_1$ is set to the maximum CT value along the line. The model-fitting process then provides a robust estimate of the exterior and trabecular CT values ($y_0$, $y_2$) and also the location of the edges ($x_0$, $x_1$). The $y_1$ constraint tends to result in the edges being located on $y_{blur}$ almost exactly halfway between $y_0$ and $y_1$, and $y_2$ and $y_1$, as in FIG. 4. Since $y_1$ is the maximum observed CT value, this is very similar to the 50% relative threshold method.

new fixed The new model-fitting technique with an assumed cortical CT value ($y_1$) fixed over all data sets scanned in the same way with the same scanner. For the experiments reported in Section 3, a value of 1750 HU was used throughout.

new variable The new model-fitting technique with an assumed cortical CT value ($y_1$) chosen individually for each data set. A CT slice is selected far enough down the femur for the cortex to be sufficiently thick, such that the blurred CT peak attains the same value as the unblurred peak (i.e. as in FIG. 2(*a*), but not (*b*) and (*c*)). The model is then fitted at multiple locations on this slice with both $y_1$ and $\sigma$ unconstrained. The average estimated $y_1$ is then used to fix the cortical CT value for that data set.

There are, of course, many ways that the threshold and half-max methods could have been implemented. We chose implementations that allow a direct comparison with the new technique, and are sufficiently robust to provide independent estimates at a large number of locations on the proximal femur. While different implementations will undoubtedly vary in their nuances, they will nevertheless share the same high-level characteristics. Thresholding will sometimes miss the cortical layer entirely, and techniques similar to our half-max implementation, including the 50% relative threshold method, will estimate the PSF rather than the cortical thickness when the latter is relatively thin.

2.3. Mapping of Thickness to the Cortical Surface

So far, we have restricted our discussion to finding a cortical thickness estimate at one location in the data, given prior knowledge of both the approximate cortical surface location and orientation. However, to probe any relationship between cortical thickness and hip fracture, and to assess the various thickness estimation techniques, we would like to be able to map cortical thickness across the entire surface of the proximal femur.

An approximate exterior cortical surface can be extracted from the CT data by thresholding at an appropriate value. After clicking on one seed point inside the femur, a 3D flood fill algorithm is used to label all connected CT voxels above the threshold. This results in a set of labelled pixels in each CT image, from which contours can be extracted to sub-pixel precision by making use of the threshold. Labelled regions frequently contain holes where the CT value in the trabecular bone drops below the threshold, but these are readily eliminated by discarding all contours that are circumscribed by another. This fully automatic process results in one or more contours on each slice. There are roughly 150 slices for the MDCT data sets with 1 mm slice thickness, and 50 for the 3 mm examples. For the high resolution Xtreme pQCT data, where the slice thickness is 0.082 mm, contours were extracted on every fourth slice, giving roughly 450 slices in total.

Figure 5A:
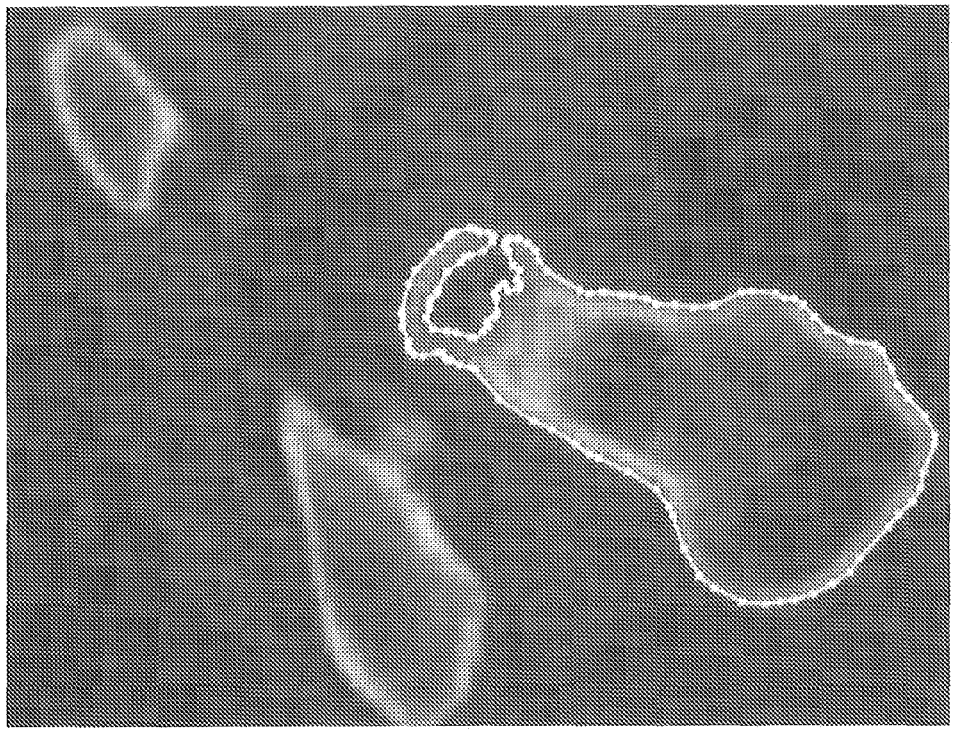
FIG. 5 shows creation of the surface and the use of surface normals for guiding thickness estimation. A surface is generated by thresholding the entire data set, then extracting contours in each plane to sub-pixel resolution. Contours are then locally edited (a) to correct erroneously excluded regions and (b) to remove any adjoining structures. A surface is interpolated through these contours, and the surface vertices and normals used to guide the in-plane thickness estimation. (c) The surface normals are shown in cyan, cortical edges as red dots, and the plot shows the thickness estimation process for the red line at the bottom.
Figure 5B:
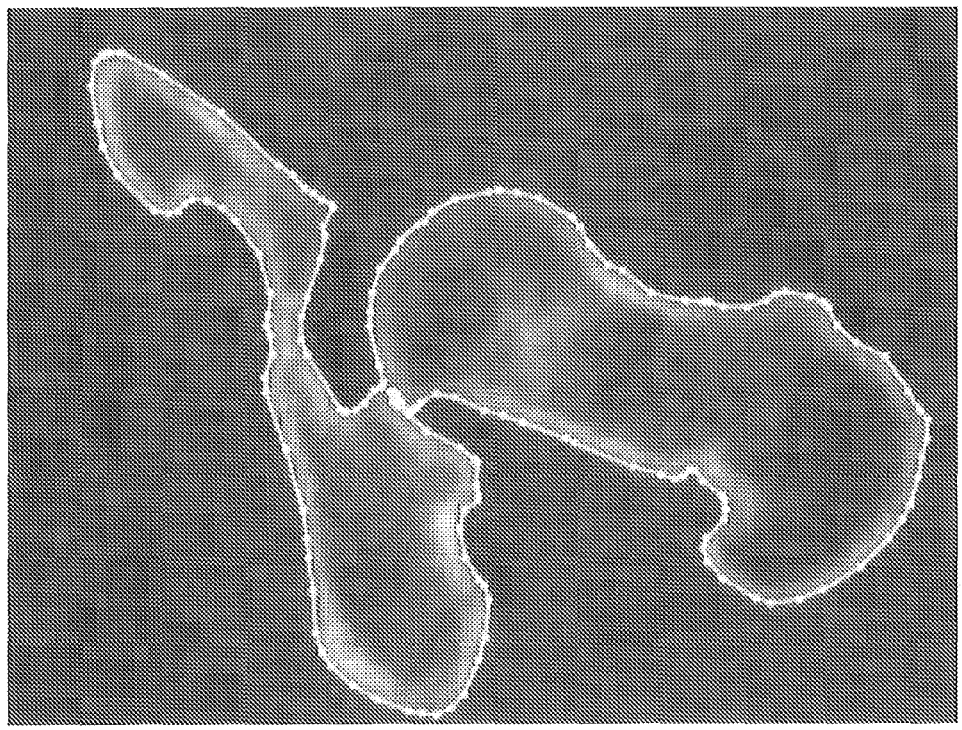

Following this automatic process, the contours are checked manually and edited where necessary. FIGS. 5(a) and (b) show the two most common causes of error. The entire set of contours is then converted to a discrete 3D shape-based representation see, for example, [Treece, G. M., Prager, R. W., Gee, A. H., Berman, L., November 2000. Surface interpolation from sparse cross-sections using region correspondence. IEEE Transactions on Medical Imaging 19(11), 1106-1114] and an iso-surface extracted at the original contour locations see, for example, [Treece, G. M., Prager, R. W., Gee, A. H., 1999, Regularised marching tetrahedra: improved iso-surface extraction, Computers and Graphics 23(4), 583-598]. An iso-surface is a surface between two different sets of CT values, for example >800, <800, representing bone/not bone, defining a bone surface). This creates a detailed, triangulated surface of the proximal femur, with sub-pixel precision except at those locations where manual editing was necessary. The whole process takes approximately 15 minutes for typical low resolution data, producing a surface with up to 20,000 vertices. Surfaces extracted from the high resolution data are far more detailed, with over 200,000 vertices and a total processing time of about an hour. The skilled person will appreciate that many techniques may be employed for extracting the 3-D surface; those referenced have been found to work particularly well.

Figure 5C:
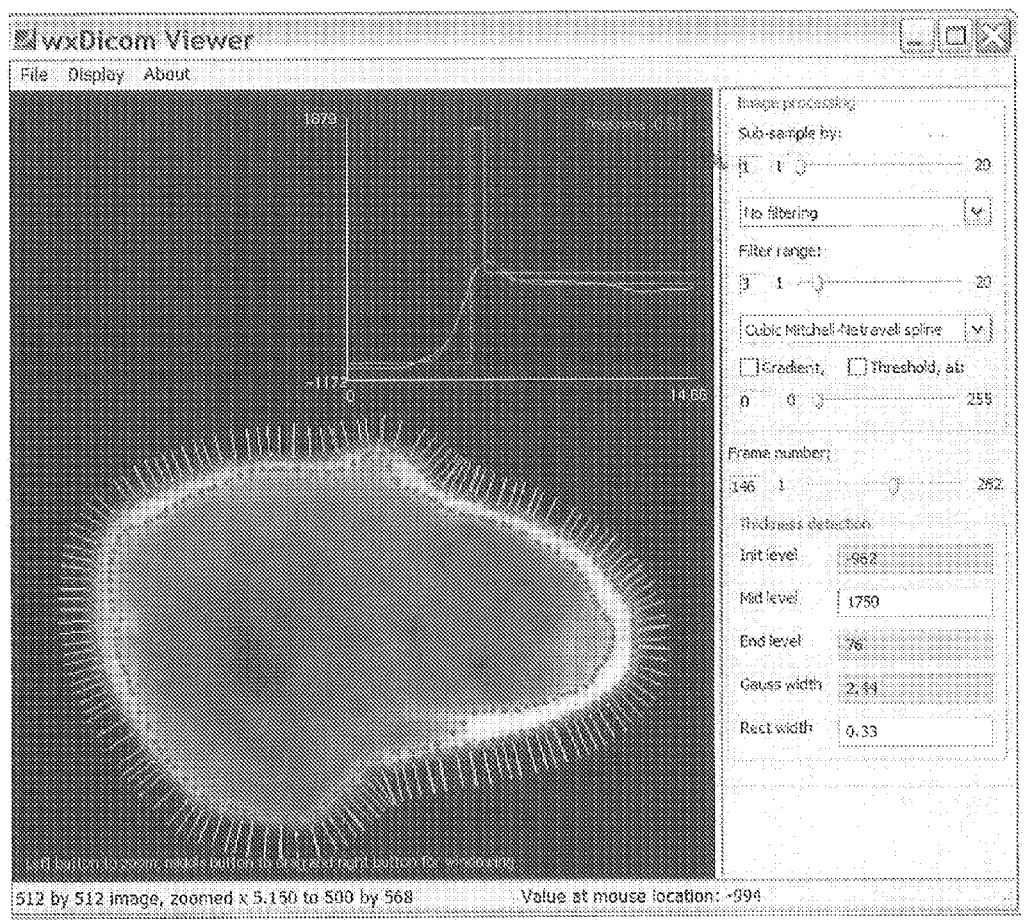

The vertices of these surfaces are used as locations for the thickness estimates, with the corresponding surface normals defining the orientation of the cortical layer. These are projected back onto the nearest CT plane: one such plane is shown in FIG. 5(c). The cyan lines show the projected vertices and normals. The red points are the cortical edges $(x_0, x_1)$ estimated at each vertex, using lines parallel to the projected normals and positioned such that each vertex lies exactly one third of the way along the corresponding line.

It should be emphasised that the segmented surface is used only to position and orient the lines along which the thickness estimates are made, and to calculate the appropriate value of a for eqs. (4) and (7). Actual cortical edges are found using the model-fitting process, and the exterior edges are generally not coincident with the projected vertices. The outcome is one thickness estimate per surface vertex. The thicknesses can be displayed collectively as a colour map painted onto the surface, as in FIG. 6(a).

Figure 7C:
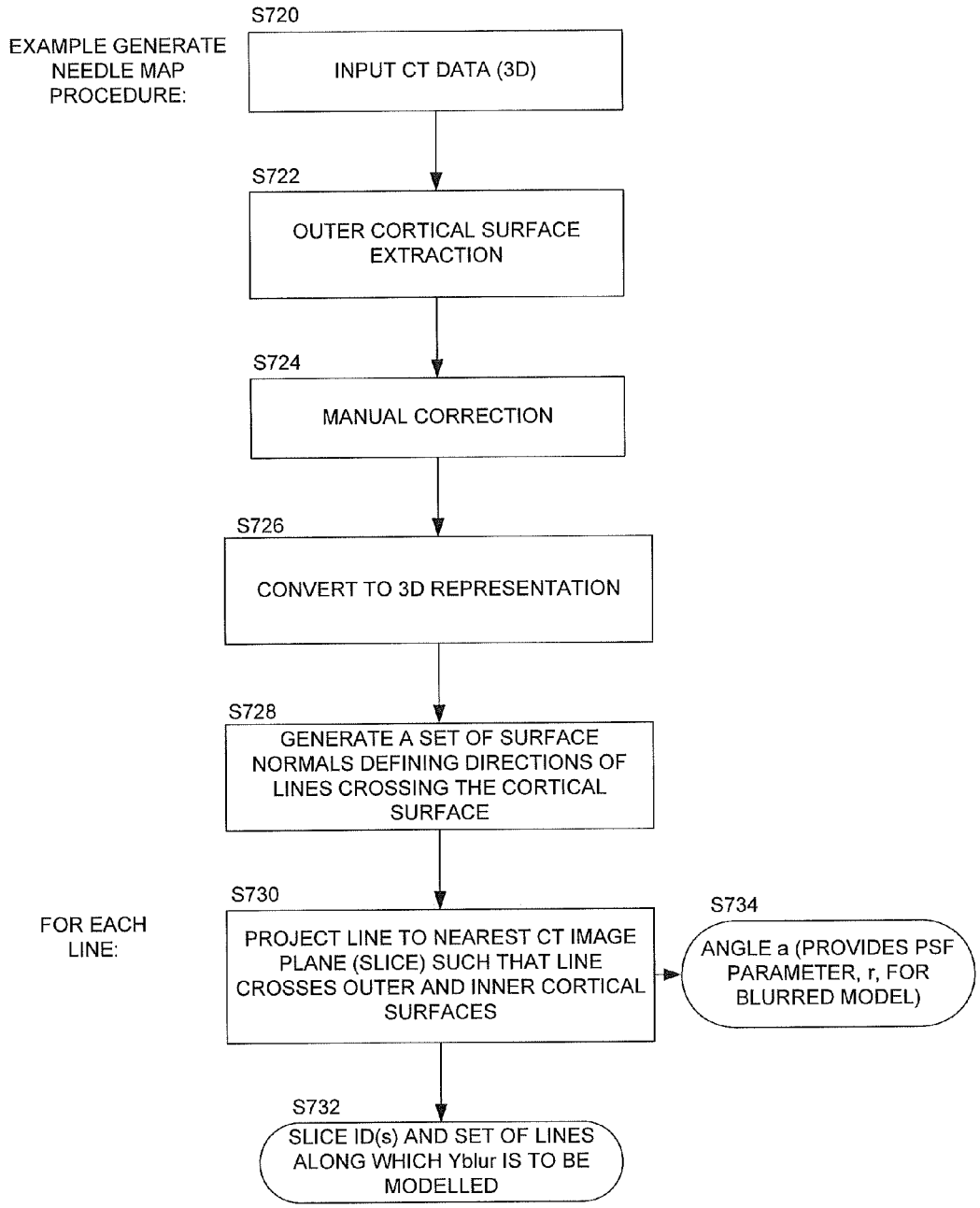

Referring now to FIGS. 7a to 7d, these illustrate steps in a computer program implementation of the above described procedures. In more detail, FIG. 7a shows an embodiment of a cortical bone thickness estimation procedure to estimate cortical bone thickness along a line preferably orientated normal to a surface or perimeter of the bone. Thus at step S700 the procedure inputs CT data for a CT scan slice corresponding (nearest) to the line, and at step S701 inputs data defining the direction of the line and the approximate location of the line. Then at step S702 the CT data is resampled to obtain a set of equally spaced points along the projection of the line in the image plane brackets slice). The cortical bone density value is then constrained either, for example, using an assumed value for the tomographic scanner, or by determining a constraint value using the procedure of FIG. 7b (S704). Then (S706) the blurred model of the CT image of the bone is fitted to the resampled data with the image blur (point spread function) as a variable parameter. The positions of the inner and outer boundaries of the cortical bone are variables in the model (their locations in the CT slice are determined by the angle the normal to the surface of the cortical layer makes with the slice), and hence the model fit procedure effectively determines values for these parameters, and hence an estimate for the cortical bone thickness (S708).

FIG. 7b shows a procedure which may be used to determine a value for the cortical bone density to be used when constraining the model fit, when this constraint value is derived from the CT data. Thus at step S710 the procedure inputs CT data and then (S712) identifies a CT slice at a location where the bone cortex thickness is at least twice the point spread function blur, for example, greater than 2 mm, 3 mm or 4 mm. In practice this is not difficult as there are extensive regions in the femur where the cortical bone thickness is around 6-7 mm. The identification may be performed manually or automatically. The procedure then generates a representation of the 3-D surface at the location of the selected slice and, from this, generates a needle map of surface normals at this location (S714). Then along a plurality of these surface normals the procedure fits the above described blurred bone image model with both the cortical bone density ($y_1$) and in-plane blur ($\sigma$) unconstrained (S716). This provides a plurality of estimates of the cortical bone density, which are then averaged to define a cortical bone density value to set for the model fitting procedure of FIG. 7a, for use when estimating the cortical bone thickness.

Referring now to FIG. 7c, this shows an example of a procedure which can be used to generate a needle map of surface normals to the cortical layer, thereby defining a set of lines for use in the procedure of 7a. Thus at step S720 the procedure inputs 3-D CT data and at step S722, extracts a representation of the outer cortical bone surface, optionally including a manual correction (S724) and if necessary, conversion to a 3-D representation (S726). In a preferred implementation of this process (Treece et al, ibid) the result is data defining a triangulation of the surface, that is data defining vertices of a set of triangles which span the surface, from which a set of surface normals defining directions of lines crossing the cortical surface can be generated (S728). The lines and surface are represented in 3-D and since the locations of the CT slices are also known in 3-D it is straightforward to identify the nearest slice. For each line the line is projected onto this slice (S730) such that it crosses both the outer and inner cortical surfaces and extends (not too far) into the tissue on either side. The result of this procedure is a set of lines and corresponding identification of one or more CT slices along which the blurred data is to be modelled (S732) and, for each line, an angle, a, between the line and the imaging plane (S734), which provides the PSF parameter, r, for the blurred model.

As previously mentioned, the procedure of FIG. 7c is optional since the cortical bone thickness may be measured in a CT imaging plane defining line directions which are normal to the cross-section of bone viewed in the imaging plane, more specifically normal to the outer perimeter of the viewed cross-section. This perimeter may be identified, for example, by using pixel value gradient information to identify an edge; a set of lines may then be defined by moving around the perimeter in a direction orthoganol to this gradient. Thus "in-plane" thickness measurements may be made without needing 3-D data. These measurements may be evaluated, for example by comparing with values for the same, fiducial slice in the same patient imaged at different times and/or in different patients and/or against a norm.

Figure 7D:
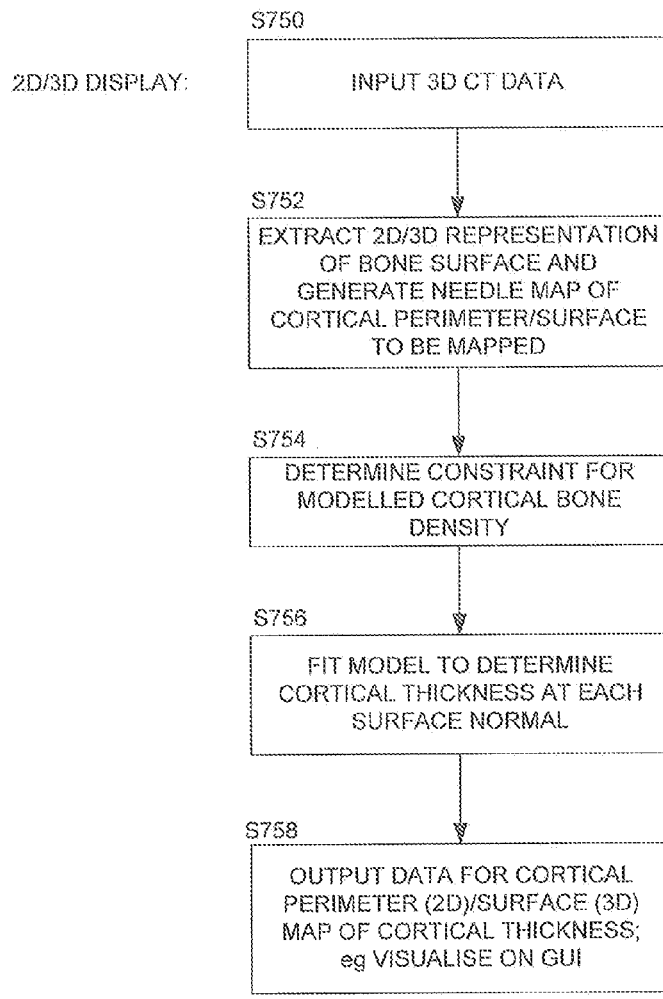

Referring now to FIG. 7d, this shows a flow-diagram of a method of representing an estimate of cortical bone thickness as a map on a 2-D or, preferably a 3-D representation of the surface of the bone whose thickness is mapped. This representation is particularly useful in identifying regions of fracture risk, for example, the femoral neck region, and is particularly with embodiment of the thickness estimation procedure described above because these provide unbiased estimates (in the sense of having substantially no systematic error). Thus at step (S750) the procedure inputs 3-D CT data and, at step S752, extracts a 2-D or 3-D representation of the imaged bone surface and generates a needle map of edge/surface normals to the cortical perimeter/surface onto which estimated thicknesses are to be mapped. Then, at step S754, the procedure determines a constraint for modelled cortical bone density, for example as described above, and at each surface normal fits a model to determine the estimated cortical thickness S756). The procedure then outputs data defining the cortical perimeter or surface in 2-D or 3-D combined with corresponding estimated cortical thickness data (S758), which may then, for example, be visualised and/or manipulated on a graphical user interface of a computer system. Although the above described estimated cortical bone thickness mapping technique is particularly advantageously performed when using the cortical thickness estimation techniques for your previously described, implementations of the procedure are not limited to such techniques and may also usefully be employed with other methods of estimating cortical bone thickness including, but not limited to, the threshold, and half-max techniques also outlined above.

Figure 7E:
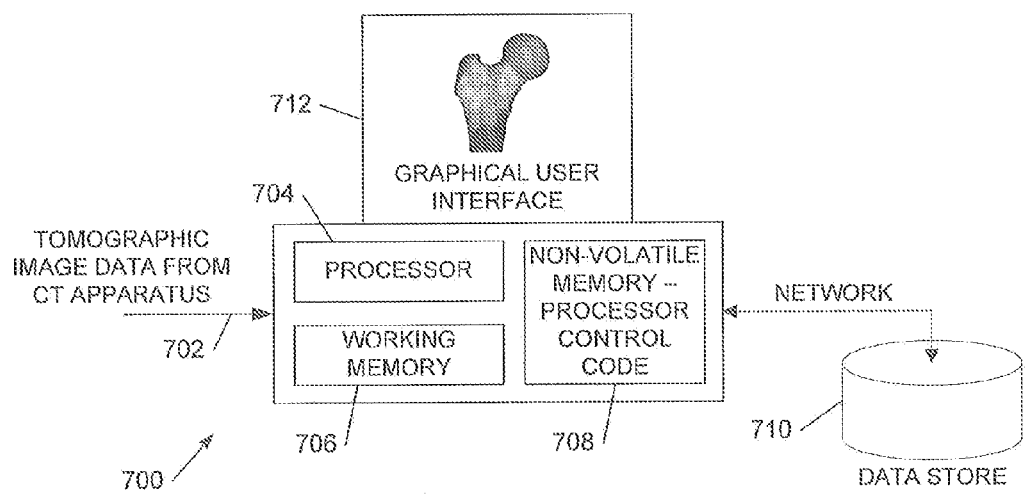

Referring now to FIG. 7e, this shows a block diagram of a general purpose computer system 700 programmed to implement embodiments of the above described procedures. The computer system has an input 702 to receive tomographic image data from CT apparatus and includes a processor 704 coupled to working memory 706 and to non-volatile memory 708 storing processor control code, in particular for perimeter/surface normal generation, cortical bone density constraint determination, model fitting and 2-D/3-D graphics display. The computer system may be coupled to a data store 710 via network, for example to store bone thickness estimate mapping data for one or more patients. The working memory 706 stores intermediate data for the calculations described above.

The computer system 700 also includes a graphical user interface 712 for displaying a colour map of estimated cortical bone thickness over the imaged 3-D surface of the bone, as previously described.

2.4 Evaluation

Figures 6A, 6B:
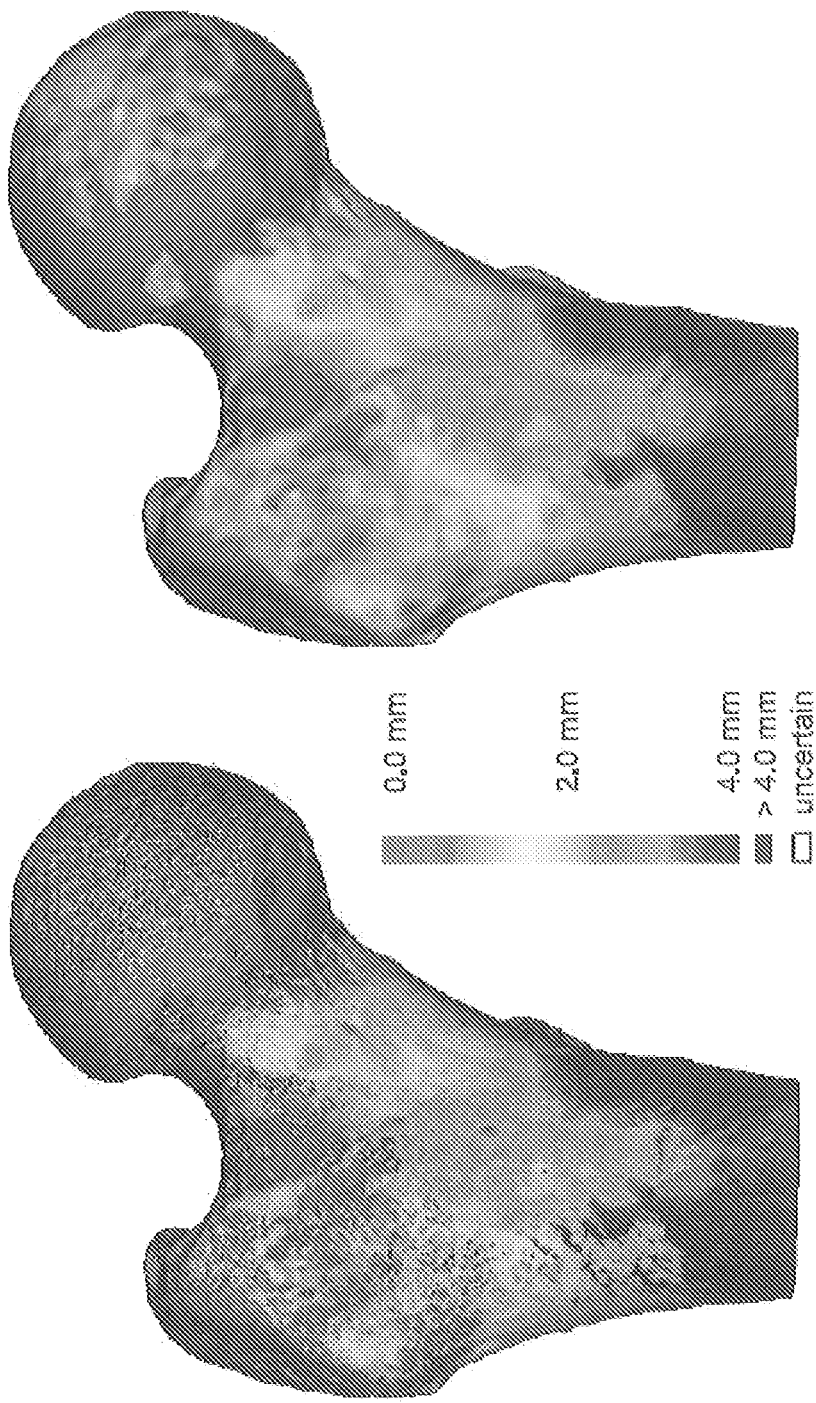
FIG. 6 shows mapping and filtering of high resolution thickness estimates (a), (b), and registration of high and low resolution surfaces (c)-(f): (a) Once cortical thickness has been estimated at each vertex, this is mapped back onto the surface as a colour. (b) The high resolution thickness map is filtered over the surface, such that the spatial resolution of the map is approximately equivalent to that of the low resolution data. High resolution (c) and low resolution (d) surfaces are aligned using manual registration followed by the ICP algorithm. (e) The registered surfaces. (f) Point-wise alignment discrepancies are generally well below 1 mm.
Figure 6C:
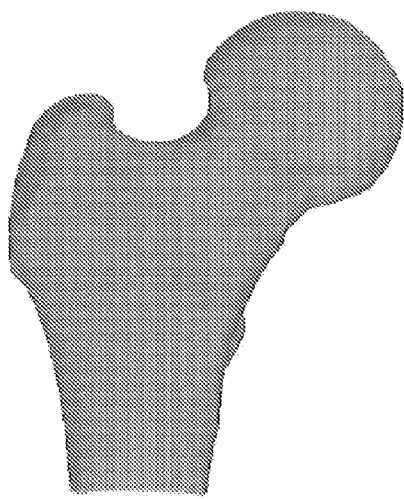
Figure 6D:
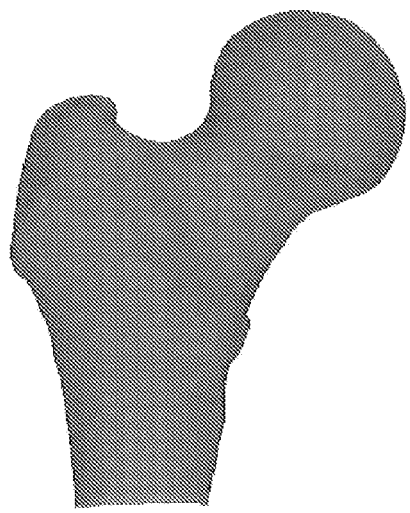
Figure 6E:
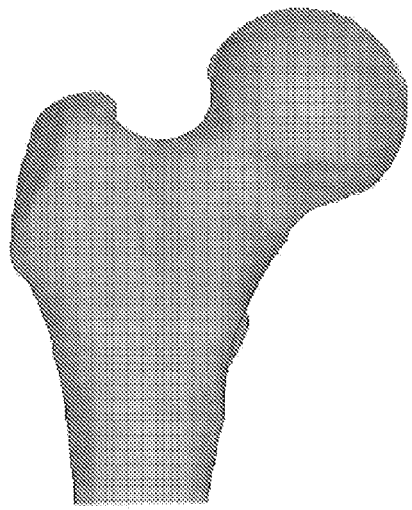
Figure 6F:
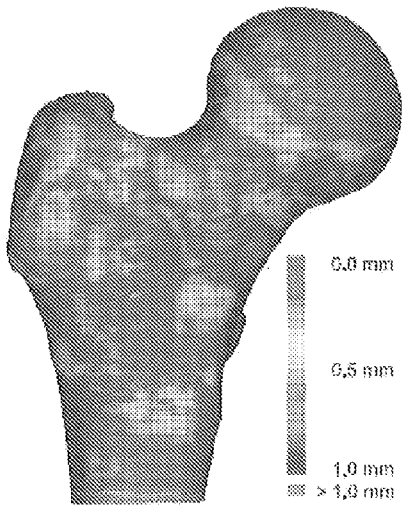

Sixteen cadaveric femurs were scanned in air using both high resolution Xtreme pQCT (82 µm/pixel, 82 µm slice thickness) and low resolution Siemens Somatom Sensation 64 MDCT (589 µm/pixel, 1 mm slice thickness). Cortical surfaces were extracted from these independently. Thickness estimates were mapped to the high resolution surface using the half-max method, since this is known to be a good, unbiased estimator, as long as the cortical thickness is sufficiently large compared with the imaging PSF (Prevrhal et al., 1999), which is almost certainly the case for the Xtreme data (we shall return to this point in Section 4). All four thickness estimation methods were used on each low resolution data set, and compared with the 'gold standard' high resolution measurements. To facilitate a meaningful comparison, the high resolution thickness estimates were smoothed over each surface using a filter weighted by the inverse of the residual model-fitting errors. The extent of the smoothing kernel was chosen to match the spatial resolution of the lower resolution data, as shown in FIG. 6(b). In effect, we assume that the best we can do with the low resolution data is provide a thickness estimate that accurately represents the average thickness over the extent of the imaging PSF.

To compare corresponding high and low resolution thickness maps, the two surfaces were first brought into approximate alignment by hand, using interactive visualization software that allows the pose of one surface to be varied while the other remains stationary. The registration was then refined using a fairly standard implementation of the iterative closest point (ICP) algorithm [Besl, P. J., McKay, N. D., February 1992, A method for registration of 3-D shapes, IEEE Transactions on Pattern Analysis and Machine Intelligence 14(2), 239-256], as illustrated in FIG. 6(c)-6(f). For each vertex on the low resolution surface, the closest vertex on the high resolution surface was found. Since the low and high resolution scans do not cover exactly the same areas of bone, some way of ignoring unmatched vertices is required: we chose to simply ignore any vertices on the low resolution surface that were more than 1 mm away from the closest vertex on the high resolution surface. An error metric was then defined as the sum of the squared distances from each remaining vertex on the low resolution surface to the closest vertex on the high resolution surface. This metric was minimized by adjusting the pose (six degrees of freedom, translation and rotation) and the scale of the low resolution surface. The scale parameter allows for any systematic discrepancy between the two surfaces caused by the segmentation technique. (Thresholding the blurred, low resolution CT data produces contours that are typically 1-2% larger than the corresponding high resolution contours. Thus, seven degree-of-freedom (DOF) registration gives a slightly better fit than six DOF registration. Exploratory investigations with six DOF registration showed that the subsequent thickness comparisons were not particularly sensitive to the nuances of the registration technique). Optimization was performed using the Levenberg-Marquardt method, ibid. The ICP algorithm involves iterating this procedure, starting each iteration with a new search for the corresponding points, until the pose and scale parameters converge. For all sixteen femurs, convergence was typically within 100 iterations, requiring around 15 s of computation on a 2.4 GHz Intel Core 2 Duo 6600 processor.

Having registered the surfaces, each low resolution thickness estimate was compared to the geographically closest estimate on the high resolution surface. Where this closest estimate was located more than 1 mm away, the two estimates were ignored, since we do not wish alignment errors to unduly influence the results. Such misalignments occur when the high resolution surface follows small, superficial features that are not resolved in the low resolution data. In practice, the 1 mm tolerance excluded only a few percent of the low resolution thickness estimates. There remained, for each femur, up to 20,000 independent estimates, with corresponding high resolution 'ground truth', spanning the entire range of cortical thicknesses encountered on the proximal femur. From these, we calculated the mean (accuracy) and standard deviation (precision) of the error statistic $t_l-t_h$, where $t_l$ is the low resolution thickness estimate and $t_h$ is the corresponding high resolution estimate.

Figure 8:
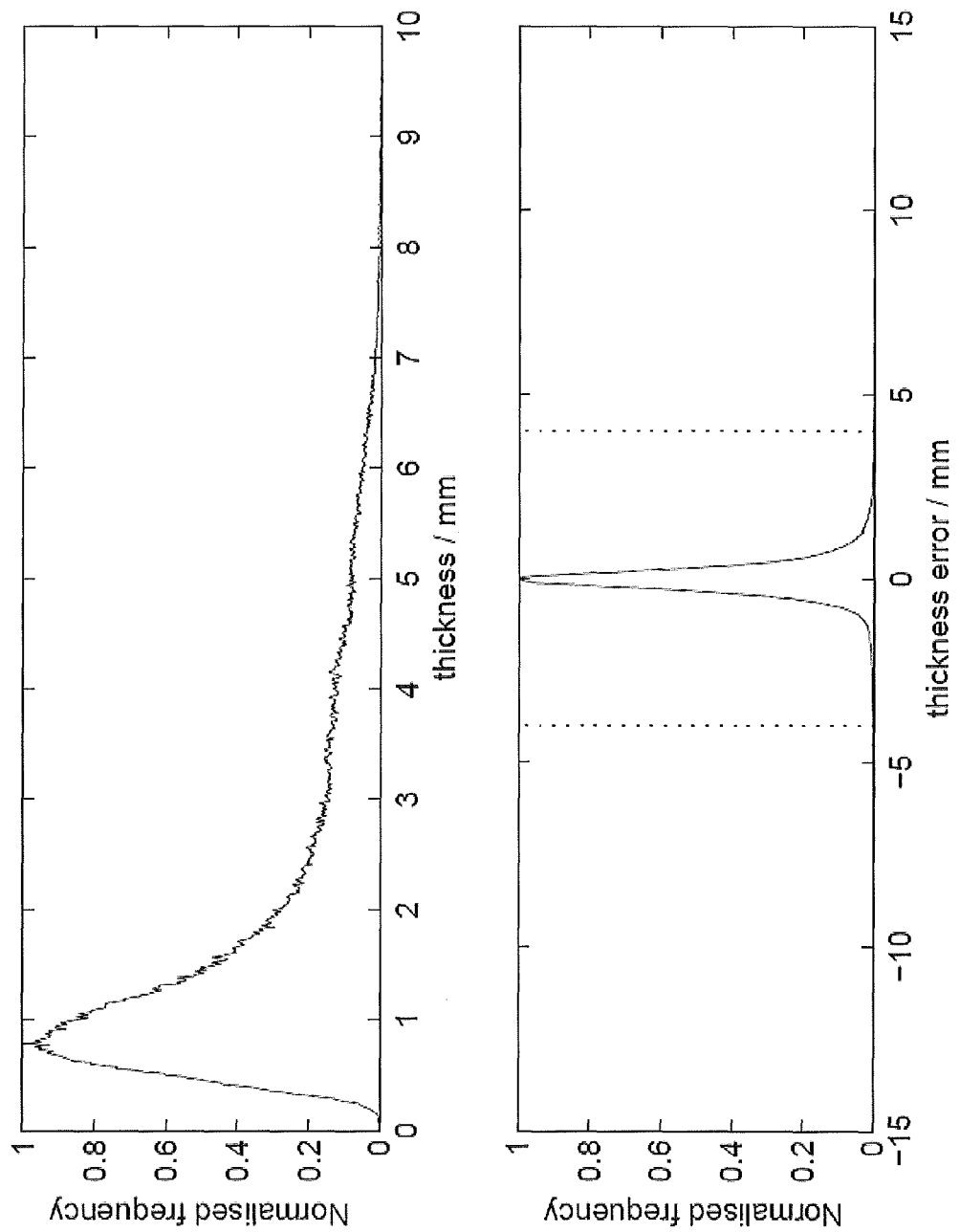
FIG. 8 shows distribution of cortical thickness and errors across all sixteen cadaveric data sets. The top graph shows the thickness distribution derived from the high resolution data. The bottom graph shows the error distribution for the 'new variable' measurement method. Despite the narrow peak, there are outlying errors up to ±15 mm. The dotted lines indicate the 4 mm limits used to exclude poor matches from some of the subsequent error analysis

FIG. 8(a) shows the average distribution of cortical thickness over the sixteen proximal femurs, which is well populated in the 0.25 mm to 6 mm range. Since we are more interested in thinner cortical regions, we use 0 mm to 4 mm colour maps for surface renderings such as those in FIG. 6(a), (b). The error distribution for the 'new variable' thickness estimation technique is shown in FIG. 8(b). While there is a narrow peak, outlying errors extend up to ±15 mm.

Figure 9A:
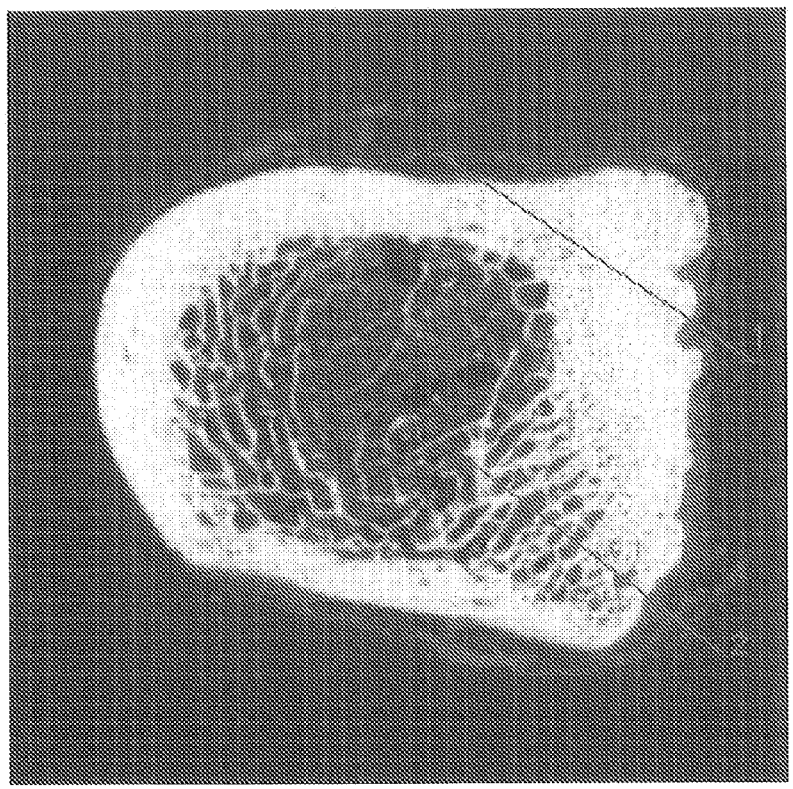
FIG. 9 shows difficulties comparing low and high resolution thickness measurements. (a) and (b) show corresponding high and low resolution slices through the CT data. (c) and (d) are plots of the CT values along the lines labelled (1) and (2) respectively. In (c), the surface normal in the high resolution data is not compatible with that of the low resolution data. In (d), there is ambiguity in the definition of cortical thickness: both estimators detect the outermost resolvable layer, but this layer is not the same at the two resolutions.
Figure 9B:
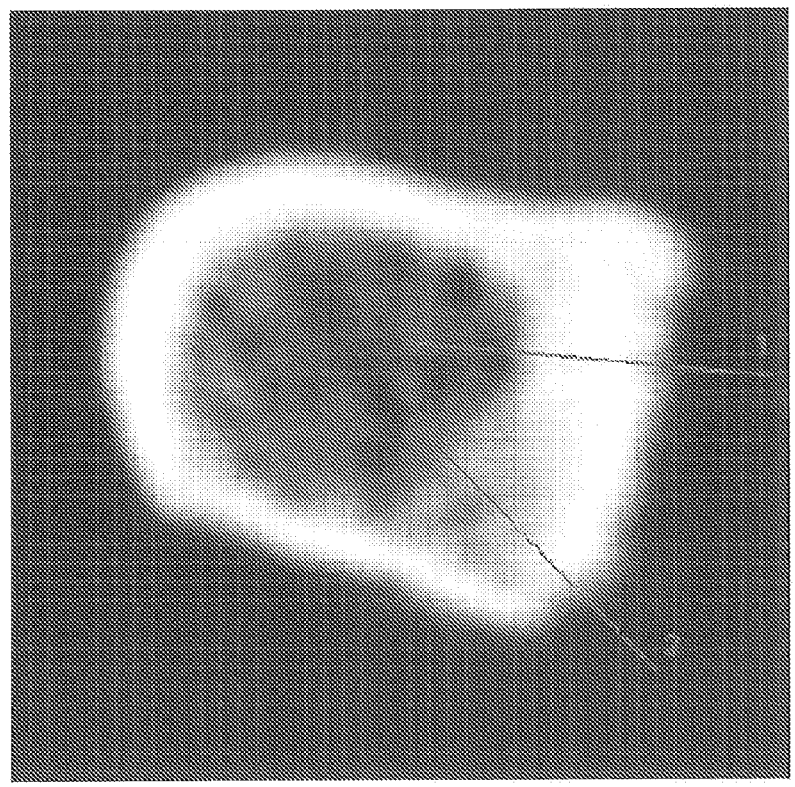

Many of these outliers can be attributed to the evaluation protocol as opposed to the thickness estimation technique. FIG. 9 shows two situations where the protocol leads to inappropriate comparisons between thickness estimates.

FIG. 9(d), in particular, demonstrates the difficulty defining cortical thickness at two different resolutions when the cortex is porous. To eliminate such inappropriate comparisons from our results, we chose a threshold of 4 mm, above which we assume the error is more likely to be an artefact of the evaluation protocol than the thickness estimation technique. Clearly, this threshold might also remove genuine estimation errors, although FIG. 8(b) shows that these will be very few in number. It is also unlikely that an error exceeding 4 mm would be mistaken for a correct measurement in practice. Nevertheless, in Section 3 we present error statistics both with and without the 4 mm cut-off, so the reader can judge for themselves.

3.1 Simulated Data

The thickness estimation methods described in Section 2.2 were first tested on simulated data, in order to investigate performance and parameter sensitivity in an ideal, noise-free environment. The model of eq. (5) was used to simulate the CT values along lines passing through cortices of varying thickness in the range 0.2 mm to 5.5 mm, with an in-plane blur σ of 1.25 mm and no out-of-plane blur (i.e. the cortical layer was assumed to lie orthogonal to the CT imaging plane). These values were chosen to match approximately those of the low resolution cadaveric data sets. The half-max, threshold and new methods were then used to estimate the original, known, cortical thickness. The latter two methods were evaluated across a range of thresholds and assumed cortical CT values ($y_1$).

FIG. 10 shows results for simulated scans in air (a) and in vivo (b) (the dashed lines show assumed $y_1$ values). The half-max method is accurate for large thicknesses but increasingly biased for smaller thicknesses. The thresholding technique is potentially more accurate below 3 mm, provided the threshold is chosen carefully. For the air simulation, a threshold of 600 HU (for the low resolution data, this corresponds to an area BMD of approximately 430 mg/cm$^2$) produces reasonable thickness estimates down to 1.3 mm. For the in vivo simulation, the ideal threshold is higher, at around 800 HU. Below 1.3 mm, thresholding starts to 'miss' the cortex and becomes increasingly unreliable. Our method generates accurate results down to the simulated thickness limit of 0.2 mm. More noteworthy is the low degree of sensitivity to the assumed cortical CT value, especially at thicknesses below 2 mm. Such thin cortices are precisely those likely to be of most clinical interest.

Table 1: Summary statistics for the sixteen cadaveric femur data sets. N is the number of vertices on the low resolution surfaces for which a corresponding 'ground truth' thickness is available. 'Percentage success' indicates how frequently each method produced any sort of thickness estimate. The final column shows the assumed cortical CT value used for the 'new variable' method. The 'new fixed' method assumed a value of 1750 HU throughout.

TABLE 1

| ID | Mean error ± 1 std. dev. (mm) | | | |
|---|---|---|---|---|
| | Half-max | Threshold | New fixed | New variable |
| 443 | 1.17 ± 1.29 | 0.36 ± 1.18 | 0.19 ± 0.82 | 0.19 ± 0.82 |
| 456 | 0.92 ± 1.31 | 0.67 ± 2.07 | 0.00 ± 0.89 | −0.05 ± 0.87 |
| 457 | 1.18 ± 2.39 | 0.14 ± 0.64 | 0.07 ± 0.74 | 0.07 ± 0.83 |
| 458 | 1.23 ± 1.32 | 0.36 ± 1.20 | 0.12 ± 0.74 | 0.21 ± 0.78 |
| 464 | 1.10 ± 1.05 | 0.47 ± 0.75 | 0.10 ± 0.54 | 0.05 ± 0.55 |
| 465 | 0.95 ± 1.18 | 0.24 ± 0.96 | 0.02 ± 0.68 | 0.07 ± 0.71 |
| 466 | 1.28 ± 3.91 | 0.18 ± 0.81 | 0.07 ± 0.52 | −0.02 ± 0.53 |
| 467 | 0.74 ± 1.52 | 0.40 ± 1.80 | −0.15 ± 1.19 | −0.14 ± 1.15 |

TABLE 1-continued

| ID | Mean error ± 1 std. dev. (mm) | | | |
|---|---|---|---|---|
| | Half-max | Threshold | New fixed | New variable |
| 470 | 1.16 ± 1.47 | 0.30 ± 1.16 | 0.05 ± 0.77 | 0.05 ± 0.77 |
| 473 | 1.02 ± 0.86 | 0.47 ± 0.94 | 0.13 ± 0.47 | 0.07 ± 0.45 |
| 474 | 1.09 ± 1.21 | 0.40 ± 1.34 | −0.09 ± 0.58 | −0.09 ± 0.58 |
| 477 | 0.77 ± 1.06 | 0.22 ± 0.84 | 0.00 ± 0.72 | −0.08 ± 0.67 |
| 483 | 0.96 ± 1.32 | 0.35 ± 1.32 | 0.12 ± 0.88 | 0.01 ± 0.81 |
| 485 | 1.12 ± 1.80 | 0.03 ± 0.50 | −0.12 ± 0.52 | −0.08 ± 0.48 |
| 493 | 1.14 ± 1.35 | 0.29 ± 1.05 | −0.03 ± 0.62 | 0.00 ± 0.62 |
| 494 | 0.94 ± 2.07 | 0.68 ± 2.22 | 0.00 ± 1.39 | 0.02 ± 1.17 |
| all | 1.05 ± 1.70 | 0.36 ± 1.31 | 0.03 ± 0.80 | 0.02 ± 0.77 |

3.2 Cadaveric Data

Summary statistics for the sixteen cadaveric data sets can be found in Table 1. For the half-max and new methods, the percentage success rate indicates how frequently the model-fitting algorithm managed to converge and hence produce a result. For the threshold method, the number indicates how frequently there were any CT values above the threshold along the line used for thickness estimation. Neither convergence nor the existence of supra-threshold values implies anything about the accuracy of the resulting thickness estimate. The processing time was similar for all methods. Loading the CT data, estimating cortical thickness at approximately 17,000 locations and saving the results to disk (but not calculating or registering the surfaces) took around five minutes on a 2.16 GHz Intel Core 2 CPU, with the software running single-threaded.

Table 2: Cortical thickness estimation error, considering the entire range of errors and thicknesses. The tabulated quantity is the mean and standard deviation of $t_l - t_h$, for all successful low resolution thickness estimates for which a high resolution match could be found.

TABLE 2

| ID | Mean error ± 1 std. dev. (mm) | | | |
|---|---|---|---|---|
| | Half-max | Threshold | New fixed | New variable |
| 443 | 1.17 ± 1.29 | 0.36 ± 1.18 | 0.19 ± 0.82 | 0.19 ± 0.82 |
| 456 | 0.92 ± 1.31 | 0.67 ± 2.07 | 0.00 ± 0.89 | −0.05 ± 0.87 |
| 457 | 1.18 ± 2.39 | 0.14 ± 0.64 | 0.07 ± 0.74 | 0.07 ± 0.83 |
| 458 | 1.23 ± 1.32 | 0.36 ± 1.20 | 0.12 ± 0.74 | 0.21 ± 0.78 |
| 464 | 1.10 ± 1.05 | 0.47 ± 0.75 | 0.10 ± 0.54 | 0.05 ± 0.55 |
| 465 | 0.95 ± 1.18 | 0.24 ± 0.96 | 0.02 ± 0.68 | 0.07 ± 0.71 |
| 466 | 1.28 ± 3.91 | 0.18 ± 0.81 | 0.07 ± 0.52 | −0.02 ± 0.53 |
| 467 | 0.74 ± 1.52 | 0.40 ± 1.80 | −0.15 ± 1.19 | −0.14 ± 1.15 |
| 470 | 1.16 ± 1.47 | 0.30 ± 1.16 | 0.05 ± 0.77 | 0.05 ± 0.77 |
| 473 | 1.02 ± 0.86 | 0.47 ± 0.94 | 0.13 ± 0.47 | 0.07 ± 0.45 |
| 474 | 1.09 ± 1.21 | 0.40 ± 1.34 | −0.09 ± 0.58 | −0.09 ± 0.58 |
| 477 | 0.77 ± 1.06 | 0.22 ± 0.84 | 0.00 ± 0.72 | −0.08 ± 0.67 |
| 483 | 0.96 ± 1.32 | 0.35 ± 1.32 | 0.12 ± 0.88 | 0.01 ± 0.81 |
| 485 | 1.12 ± 1.80 | 0.03 ± 0.50 | −0.12 ± 0.52 | −0.08 ± 0.48 |
| 493 | 1.14 ± 1.35 | 0.29 ± 1.05 | −0.03 ± 0.62 | 0.00 ± 0.62 |
| 494 | 0.94 ± 2.07 | 0.68 ± 2.22 | 0.00 ± 1.39 | 0.02 ± 1.17 |
| All | 1.05 ± 1.70 | 0.36 ± 1.31 | 0.03 ± 0.80 | 0.02 ± 0.77 |

Table 2 shows estimation accuracy and precision for the entire range of errors, i.e. not making any allowance for likely evaluation artefacts like those in FIG. 9. While it is immediately apparent that both variants of the new method are less biased and more precise than either of the alternative methods, we at this point take a brief diversion, to test the claim in Section 2.2 that constraining $y_1$ is the best strategy for conditioning the model-fitting process. To this end, we performed some supplementary experiments on femur 477, chosen since it is an average specimen in terms of the estimation errors in Table 2. In Section 2.2, we considered three possibilities:

constraining the assumed cortical CT value $y_1$; constraining the in-plane blur σ; or using no constraints at all. With femur 477, no constraints resulted in an estimation error of 0.90±4.04 mm, constraining σ (to a sensible median value obtained from the previous experiment) but not $y_1$ gave an error of 0.66±3.75 mm, whereas fixing $y_1$ at 1750 HU produced by far the best results of 0.00±0.72 mm. This is typical of our experience with all the data sets we have examined. There was very little difference in the percentage success rates for each of these variants of our technique.

Table 3 presents the results after accounting for likely evaluation artefacts using the ±4 mm error cut-off suggested in Section 2.4. The order of merit of the various methods is the same as in Table 2, though clearly all the standard deviations are reduced. These results may better reflect the actual measurement error across the entire surface of the proximal femur. Finally, Table 4 presents results confined to areas where the cortex is relatively thin, in the range 0.3 mm to 2 mm. Such areas are likely to be the focus of interest when assessing fracture risk. For thin cortices, the differences between the methods are even more pronounced.

Figure 11A:
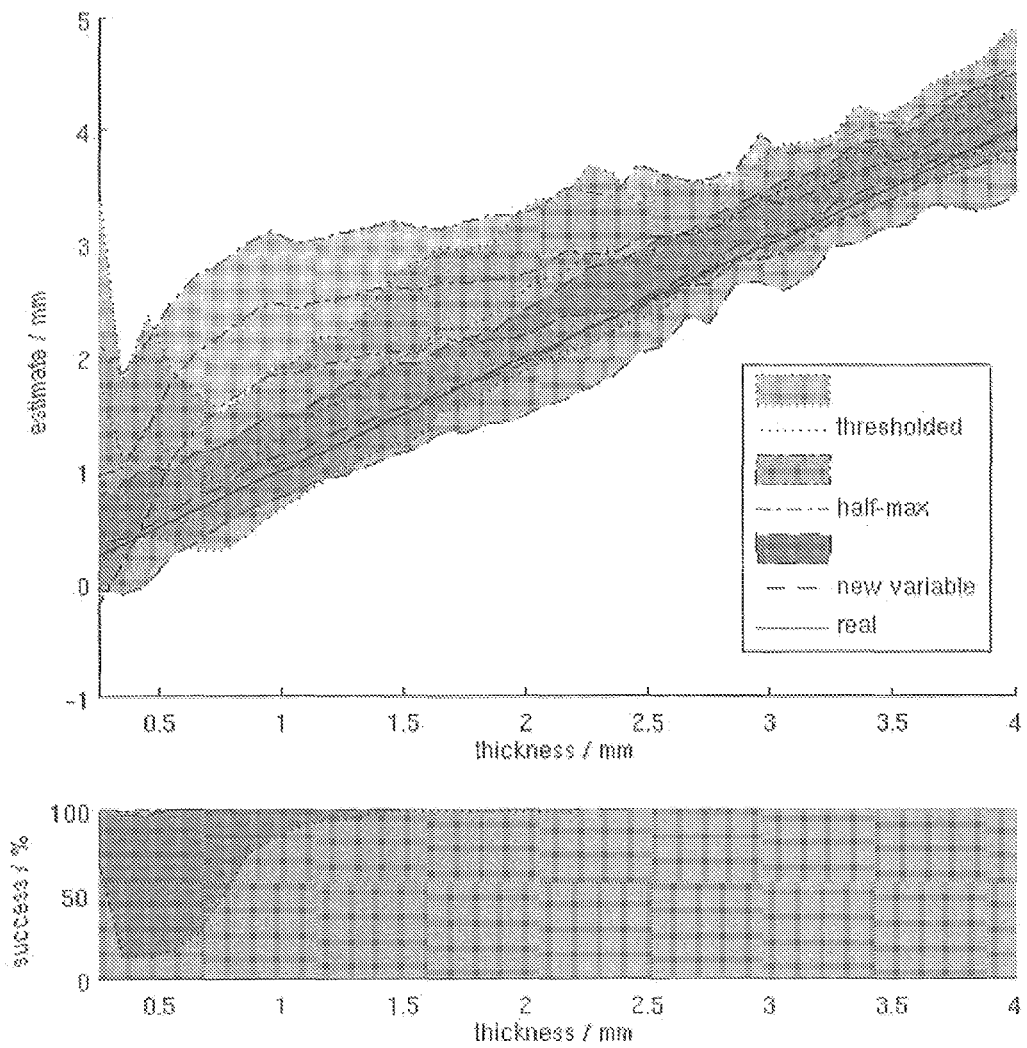
FIG. 11 shows cadaveric cortical thickness estimation as a function of thickness. The upper graph in each case shows the mean±1 standard deviation of $t_f$ on the y-axis, for each 0.1 mm band of $t_h$ on the x-axis. This is similar to the presentation used for the simulated data in FIG. 10. The lower graph indicates the percentage of successful thickness estimates in each band. (a) shows results for the best case (473), (b) for the worst (467) and (c) the combined results across all sixteen femurs. The three colours have been rendered with some transparency, so the ±1 standard deviation ranges remain distinguishable where they overlap.
Figure 11B:
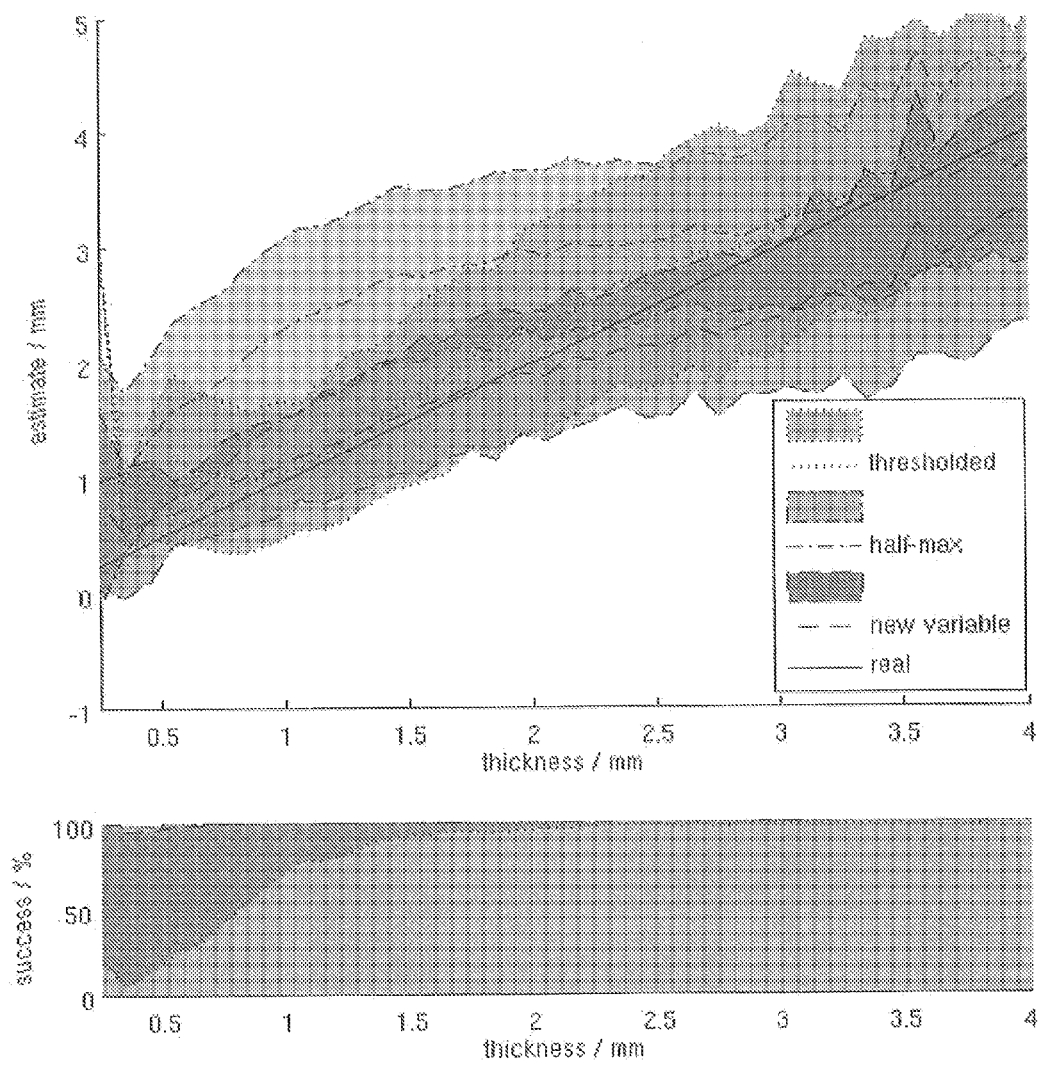
Figure 11C:
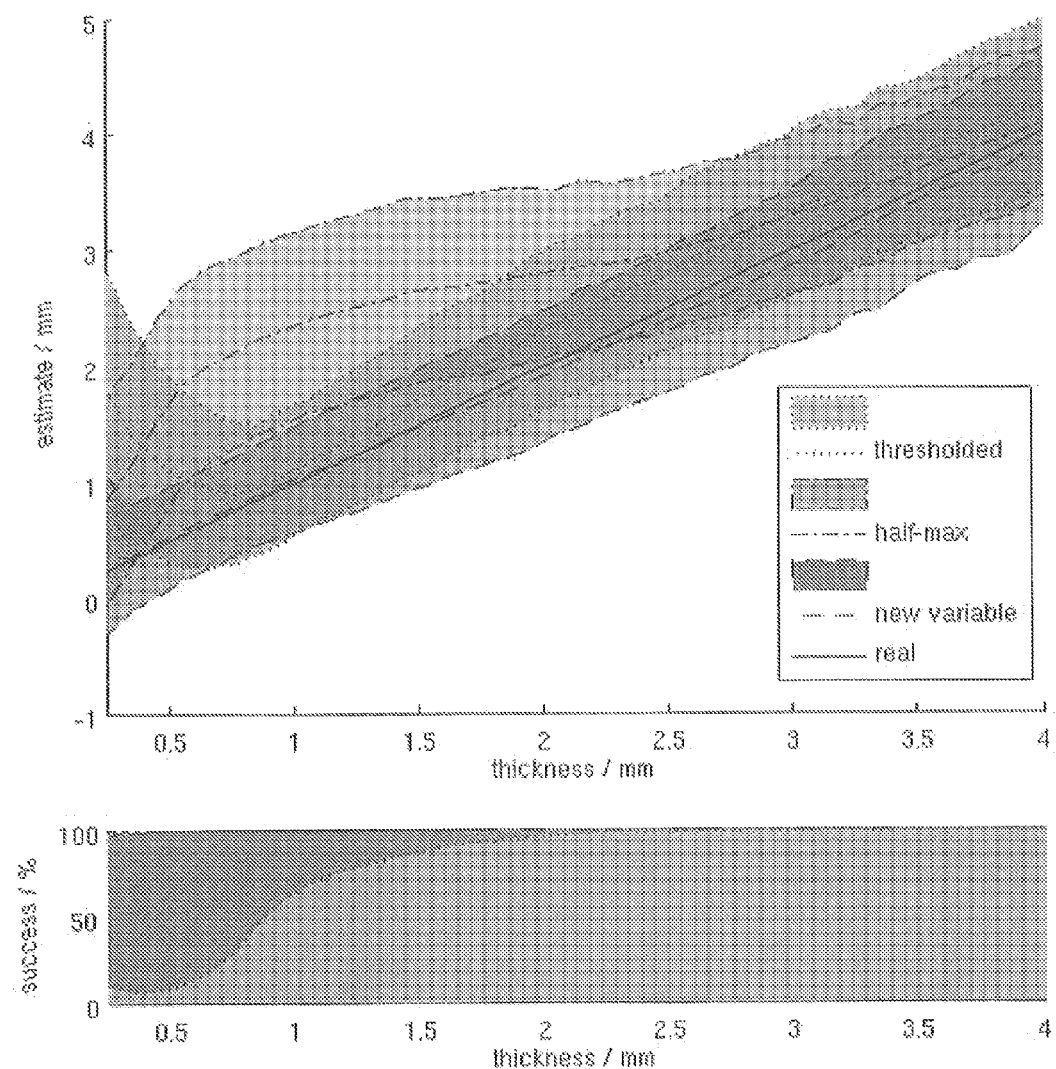

FIG. 11 expands the results in Table 3 to show performance as a function of true cortical thickness. Since the techniques produce so many independent thickness estimates in the range 0.3 mm to 4 mm (FIG. 8(a)), splitting the data for any one femur into bins 0.1 mm wide produces over 100 values per bin, and well over 1000 values when the data for all femurs is combined. This is sufficient to analyse performance as a function of thickness in the aforementioned range. The conglomerated results in FIG. 11(c) have more in common with the results for the best case (femur 473, FIG. 11(a)) than those for the worst case (femur 467, FIG. 11(b)), suggesting that the latter is the exception.

FIG. 11 also shows percentage success rates as a function of thickness (the solid straight line shows a "perfect fit"). The threshold method starts to 'miss' estimates as the true cortical thickness drops below 1.5 mm, (see % success curves at the bottom of the figures) and is largely incapable of producing any reliable results below 0.75 mm. For the carefully chosen threshold, the estimates are reasonably unbiased down to 1 mm. The half-max and 'new variable' methods both generate cortical thickness estimates over the full 0.3 mm to 4e mm range. However, the half-max method overestimates the thickness below 3 mm, whereas the new method provides relatively unbiased estimates at all thicknesses. In general, our new method also compares favourably with the others in terms of precision, again across the entire range of thicknesses.

Table 3: Cortical thickness estimation error, for errors below 4 mm and the entire range of thicknesses. The tabulated quantity is the mean and standard deviation of $t_f$-$t_h$. By ignoring the very small number of errors above 4 mm, the results might better reflect the merits of the various techniques and not the evaluation shortcomings identified in FIG. 9.

TABLE 3

| | Mean error ± 1 std. dev. (mm) | | | |
|---|---|---|---|---|
| ID | Half-max | Threshold | New fixed | New variable |
| 443 | 1.02 ± 0.90 | 0.28 ± 0.71 | 0.16 ± 0.61 | 0.16 ± 0.61 |
| 456 | 0.78 ± 0.91 | 0.38 ± 0.77 | −0.06 ± 0.61 | −0.11 ± 0.60 |
| 457 | 1.04 ± 0.83 | 0.14 ± 0.56 | 0.03 ± 0.48 | 0.03 ± 0.47 |
| 458 | 1.05 ± 0.83 | 0.29 ± 0.65 | 0.10 ± 0.57 | 0.17 ± 0.58 |
| 464 | 1.02 ± 0.85 | 0.43 ± 0.54 | 0.09 ± 0.48 | 0.04 ± 0.47 |
| 465 | 0.84 ± 0.87 | 0.20 ± 0.68 | 0.02 ± 0.59 | 0.06 ± 0.60 |
| 466 | 1.09 ± 0.90 | 0.17 ± 0.56 | 0.06 ± 0.46 | −0.02 ± 0.44 |

TABLE 3-continued

| | Mean error ± 1 std. dev. (mm) | | | |
|---|---|---|---|---|
| ID | Half-max | Threshold | New fixed | New variable |
| 467 | 0.59 ± 1.06 | 0.17 ± 0.93 | −0.21 ± 0.84 | −0.18 ± 0.85 |
| 470 | 0.94 ± 0.94 | 0.21 ± 0.64 | 0.02 ± 0.56 | 0.02 ± 0.56 |
| 473 | 0.97 ± 0.74 | 0.40 ± 0.61 | 0.12 ± 0.43 | 0.07 ± 0.42 |
| 474 | 1.00 ± 0.94 | 0.29 ± 0.68 | −0.09 ± 0.51 | −0.09 ± 0.51 |
| 477 | 0.68 ± 0.77 | 0.18 ± 0.65 | −0.01 ± 0.57 | −0.09 ± 0.55 |
| 483 | 0.83 ± 0.96 | 0.30 ± 0.82 | 0.05 ± 0.59 | −0.04 ± 0.58 |
| 485 | 1.00 ± 1.00 | 0.02 ± 0.46 | −0.12 ± 0.46 | −0.08 ± 0.45 |
| 493 | 0.96 ± 0.93 | 0.23 ± 0.61 | −0.04 ± 0.55 | −0.01 ± 0.54 |
| 494 | 0.48 ± 0.93 | 0.23 ± 0.79 | −0.18 ± 0.70 | −0.09 ± 0.73 |
| all | 0.90 ± 0.92 | 0.25 ± 0.69 | −0.01 ± 0.58 | −0.01 ± 0.58 |

Figure 12:
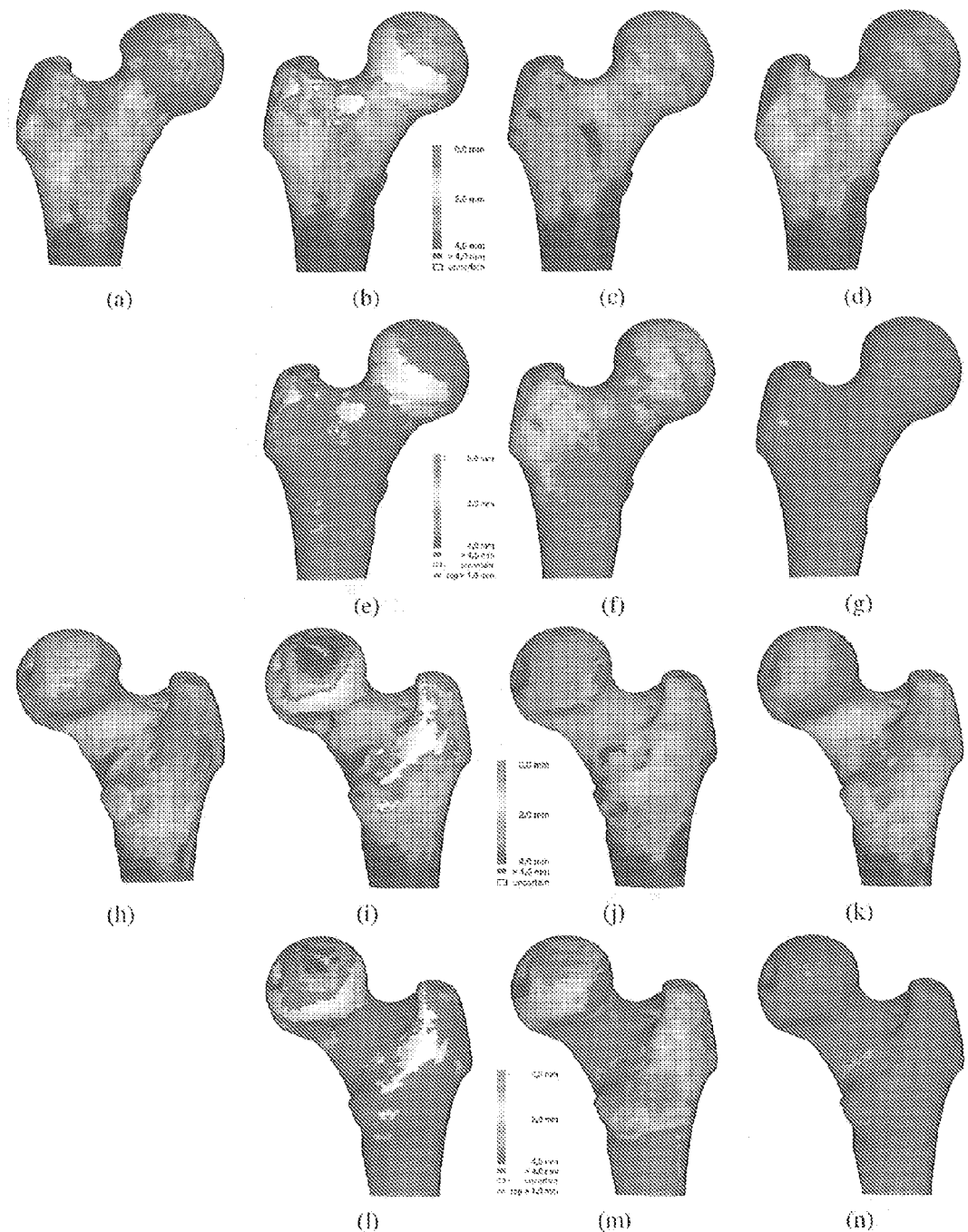
FIG. 12 shows thickness estimation for the best case (473). (a) to (d) are thickness maps from the front, (h) to (k) from the back. (e) to (g) and (l) to (n) are absolute thickness error maps. The first column (a, h) shows the high resolution 'ground truth' measurements. The second column (b, e, i, l) shows the half-max results, the third column (c, f, j, m) thresholding, and the fourth column (d, g, k, n) the 'new variable' results.
Figure 13:
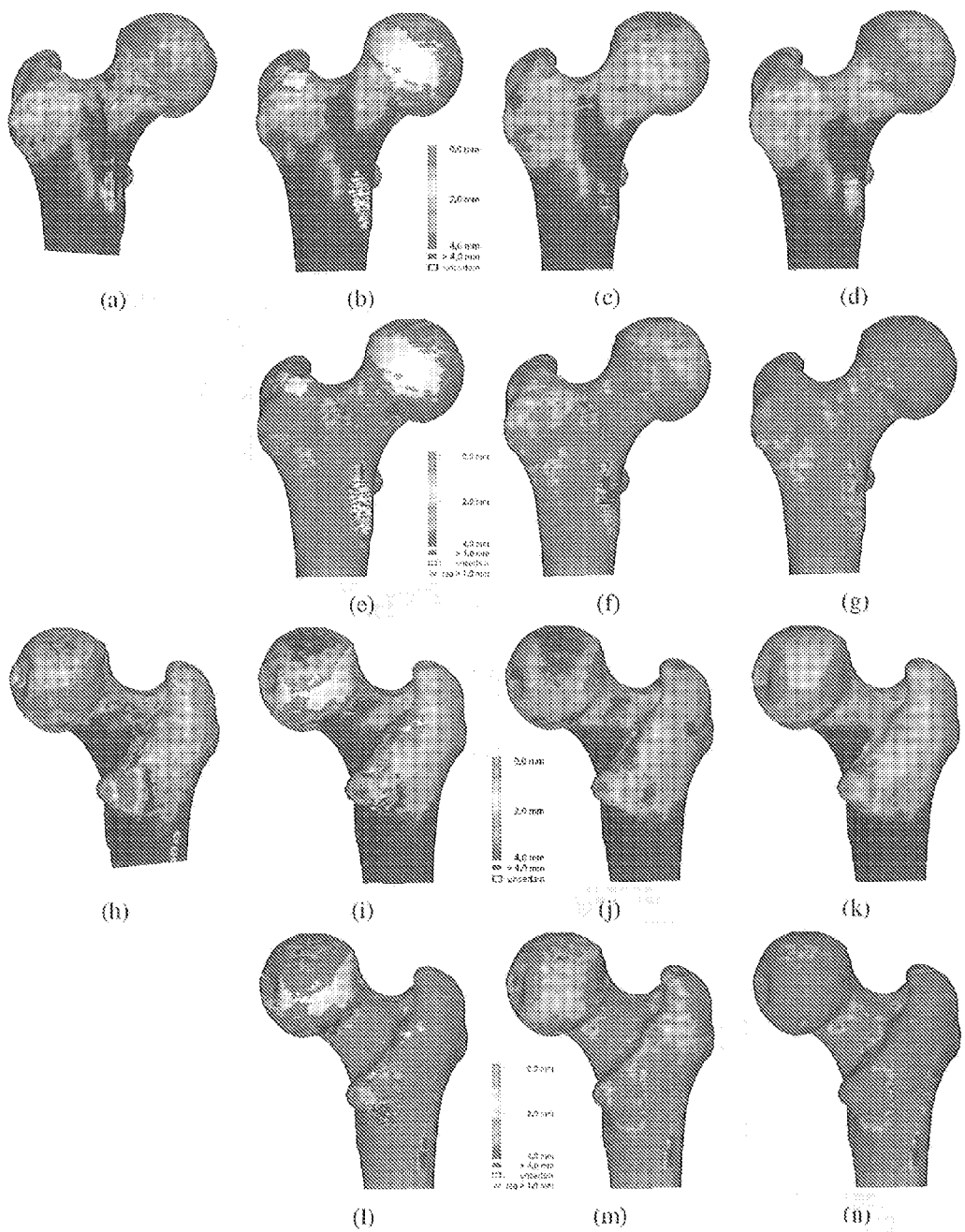
FIG. 13 shows thickness estimation for the worst case (467). (a) to (d) are thickness maps from the front, (h) to (k) from the back. (e) to (g) and (l) to (n) are absolute thickness error maps. The first column (a, h) shows the high resolution 'ground truth' measurements. The second column (b, e, i, l) shows the half-max results, the third column (c, f, j, m) thresholding, and the fourth column (d, g, k, n) the 'new variable' results.

Finally the results are presented as a function of location on the proximal femur, for the best and worst cases in FIGS. 12 and 13 respectively. These images are stills from a user interface which displays the cortical thickness as a colour map, as described in Section 2.3. The surface can be examined from any viewpoint. The light grey colour, mostly evident for the threshold method in the second column, indicates regions in which no estimate is available. Away from these regions, the threshold method produces thickness maps that appear similar to the high resolution 'ground truth' in the first column. The half-max method (third column) generates few thickness estimates below 2 mm (green). The 'new variable' method (fourth column) produces thickness maps that are similar to the high resolution maps, with absolute errors generally less than 0.5 mm (pink in the error maps).

3.3 In Vivo Data

The various methods for cortical thickness estimation were assessed using cadaveric femurs scanned in air, since the human proximal femur cannot be imaged in vivo at the high resolutions required to establish the 'ground truth'. In clinical CT scans, the femur is of course surrounded mostly by soft tissue, not air. While the new thickness estimation technique makes no assumption about the surrounding material, except that it is reasonably uniform, it is nevertheless reasonable to question how performance might vary between cadaveric and in vivo examples. It should be noted that the cadaveric femurs were not cleaned before scanning and there was some residual tissue attached to the outer cortical surface. The combination of residual tissue and air may in face have made the estimation process more difficult, since the exterior CT $y_0$ would have been estimated in an area not well characterized by a constant value.

Table 4: Cortical thickness estimation error, for errors below 4 mm and thicknesses in the range 0.3 mm to 2 mm. The tabulated quantity is the mean and standard deviation of $t_f$-$t_h$. The areas of most clinical interest are likely to be those where the cortex is particularly thin. Significantly, it is in precisely these areas that the various estimation techniques differ most in terms of performance.

TABLE 4

| | Mean error ± 1 std. dev. (mm) | | | |
|---|---|---|---|---|
| ID | Half-max | Threshold | New fixed | New variable |
| 443 | 1.43 ± 0.74 | 0.19 ± 0.58 | 0.14 ± 0.48 | 0.14 ± 0.48 |
| 456 | 1.16 ± 0.83 | 0.26 ± 0.73 | −0.04 ± 0.51 | −0.07 ± 0.49 |
| 457 | 1.29 ± 0.73 | 0.06 ± 0.44 | 0.06 ± 0.43 | 0.05 ± 0.43 |
| 458 | 1.39 ± 0.70 | 0.24 ± 0.60 | 0.12 ± 0.48 | 0.17 ± 0.50 |
| 464 | 1.24 ± 0.84 | 0.35 ± 0.53 | 0.06 ± 0.48 | 0.03 ± 0.47 |
| 465 | 1.10 ± 0.83 | −0.06 ± 0.47 | −0.02 ± 0.45 | 0.00 ± 0.47 |
| 466 | 1.37 ± 0.83 | 0.00 ± 0.41 | 0.03 ± 0.41 | −0.02 ± 0.39 |
| 467 | 1.19 ± 0.76 | 0.18 ± 0.72 | 0.07 ± 0.48 | 0.10 ± 0.49 |

TABLE 4-continued

| | Mean error ± 1 std. dev. (mm) | | | |
| --- | --- | --- | --- | --- |
| ID | Half-max | Threshold | New fixed | New variable |
| 470 | 1.33 ± 0.82 | 0.19 ± 0.65 | 0.07 ± 0.51 | 0.07 ± 0.51 |
| 473 | 1.26 ± 0.65 | 0.39 ± 0.67 | 0.13 ± 0.41 | 0.09 ± 0.39 |
| 474 | 1.29 ± 0.88 | 0.17 ± 0.61 | −0.07 ± 0.43 | −0.07 ± 0.43 |
| 477 | 0.98 ± 0.67 | 0.14 ± 0.54 | −0.04 ± 0.42 | −0.07 ± 0.38 |
| 483 | 1.32 ± 0.81 | 0.36 ± 0.73 | 0.13 ± 0.54 | 0.07 ± 0.52 |
| 485 | 1.32 ± 0.95 | −0.11 ± 0.40 | −0.12 ± 0.44 | −0.10 ± 0.44 |
| 493 | 1.29 ± 0.89 | 0.19 ± 0.65 | −0.01 ± 0.50 | 0.00 ± 0.50 |
| 494 | 0.71 ± 0.93 | 0.17 ± 0.70 | −0.22 ± 0.54 | −0.19 ± 0.54 |
| all | 1.24 ± 0.83 | 0.19 ± 0.62 | 0.01 ± 0.48 | 0.01 ± 0.47 |

Figure 14:
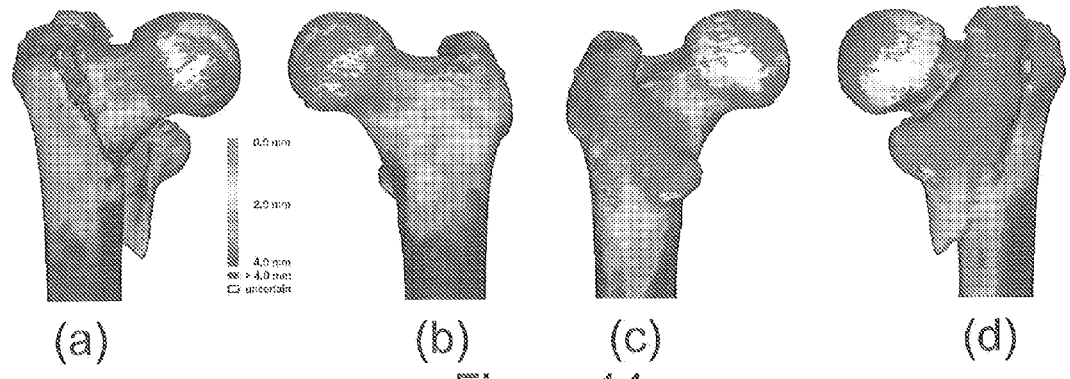

FIG. 14 shows cortical thickness maps produced using the 'new variable' method, working with in vivo MDCT data at 1 mm slice thickness. There is no ground truth for this data, and it is just a single example, so it cannot be used to draw any firm conclusions. However, there is reasonably good agreement between the independent maps on the fractured and contralateral hip; the new method produces estimates across most of the proximal femur; and the maps are not dissimilar to those in FIGS. 12 and 13. The feasibility of applying this technique to fractured hips in vivo has potential clinical significance. Compared with intact femurs, the surface extraction stage was less straightforward (more manual editing was required), but the thickness estimation stage was no different, since all measurements are mutually independent.

Figure 15:
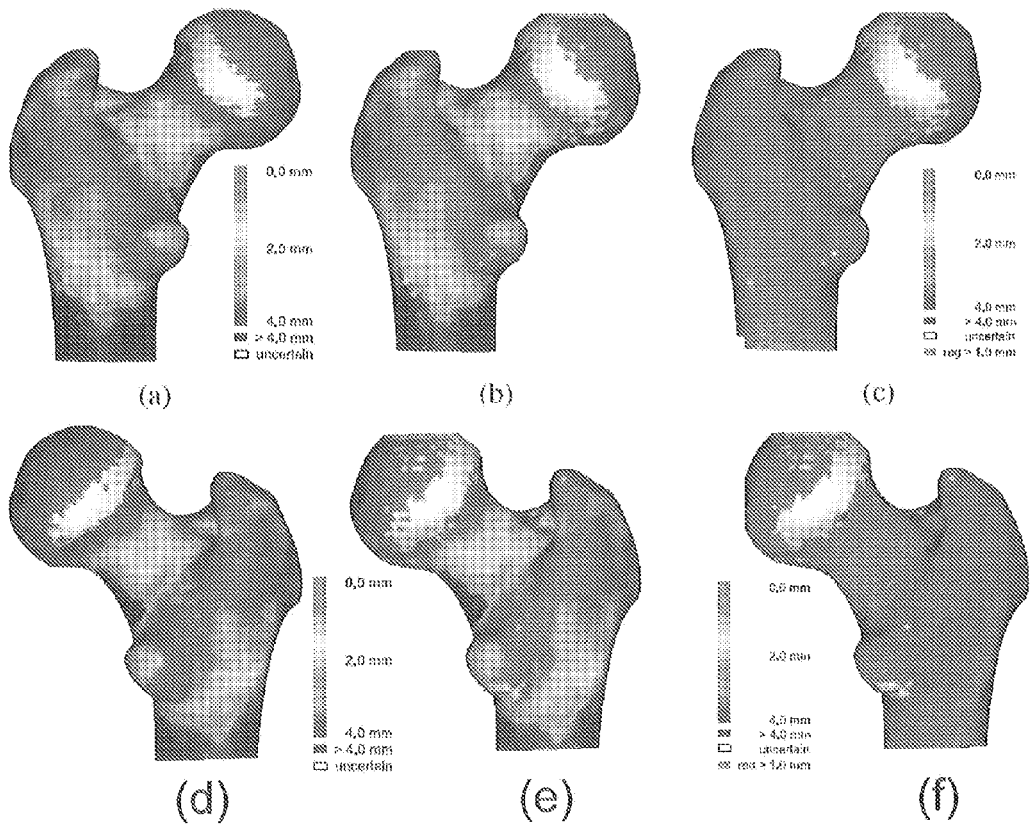
FIG. 15 shows thickness estimation at 1 mm and 3 mm CT slice thickness. The maps were produced using the 'new variable' method. (a) and (d) are estimates from CT data reconstructed at 1 mm slice thickness, (b) and (e) from the same data reconstructed at 3 mm slice thickness. (c) and (f) are absolute difference maps, revealing very few discrepancies between the two sets of results.

Clinical data is typically acquired at slice thicknesses exceeding 1 mm. FIG. 15 shows cortical thickness maps estimated using our 'new variable' method, starting from the same in vivo scan but with different CT reconstructions at 1 mm and 3 mm slice thickness. Again, we can draw no firm conclusions from a single example, but the 0.01±0.30 mm discrepancy between the two maps is remarkably low. This gives reasonable grounds for optimism regarding the applicability of the method to 3 mm slice CT data.

The light grey regions in FIGS. 14 and 15 indicate areas where the new method failed to produce a thickness estimate. This was due to the close proximity of the acetabulum to the femoral head, preventing the successful estimation of $y_0$ i.e. another bone was pressing on the femur surface so that the previously described model was not appropriate ($y_0$ was incorrect). This is not important clinically, but potentially a multi-step model could be employed if desired. The cadaveric maps are free of such regions because, although the femurs were supported by a pelvis phantom, the acetabulum was not as close to the femoral head as would be expected in vivo.

4. Discussion

In general, the various thickness estimation techniques were observed to perform in accordance with the assumed model. However, close inspection of the graphs in FIG. 11(c) reveals two clear differences from the simulations in FIG. 10. While the half-max estimates do, as predicted, attain a plateau of around 2.5 mm (consistent with an estimated in-plane blur of σ=1.25 mm), at true cortical thicknesses below 1 mm they drop below this plateau, in a manner not explained by the model. Similarly, the threshold estimates inexplicably show a sharp increase at low cortical thicknesses. To understand these phenomena, we first rule out any systematic inaccuracies in the 'gold standard' thicknesses. Recall, these were obtained by applying the half-max method to the Xtreme pQCT data, which is approximately seven times higher resolution than the Siemens MDCT data. FIG. 11(c) shows the half-max method starting to produce biased thickness estimates below 3 mm, this being with the low resolution data. It follows, therefore, that we should not trust our 'gold standard' much below 3/7=0.43 mm. This is sufficiently close to the lower limit of 0.3 mm in FIG. 11(c) that it is unlikely to have a significant bearing on the results.

Instead, explanations for these two phenomena become apparent on close examination of the data where the cortex is very thin. For the half-max method, the cortical CT value $y_1$ becomes poorly defined and is often very similar to the trabecular value $y_2$. Consequently, the inner cortical edge $x_1$ can be positioned almost arbitrarily, resulting in spurious thickness estimates that do not necessarily reflect the width of the imaging PSF. The strange behaviour of the threshold graph is driven by a relatively small number of thickness estimates: in the vast majority of cases, the imaged cortex does not exceed the threshold and the threshold method fails. However, occasionally the trabecular bone, at the $y_2$ end of the estimation line, has sufficiently high density to exceed the threshold. Thresholding then does produce a thickness estimate, but not one of the thin cortex, rather one of a thicker region of trabecular bone. This is why the threshold graph in FIG. 11(c) turns upwards.

The thickness maps in FIGS. 12 and 13 show that the errors are not homogeneously distributed across the surface. Instead, they are clustered at small focal patches. We observed similar behaviour in all sixteen data sets. The most likely cause of such errors is an ambiguous cortical-trabecular interface in these regions, suggesting different interpretations in the low and high resolution data. Certainly, the 'worst' data set (467) has a particularly dense matrix structure in the trabecular bone. The image in FIG. 9 is from this data set: at certain locations, such as around line 2, it is not at all clear where the cortex ends and the trabecular bone begins. While we attempted to eliminate such artefacts from our results by ignoring outlying errors, cortical ambiguity will not always result in a discrepancy exceeding the 4 mm cut-off, and the variances in Table 3 might therefore be seen as upper limits on the true estimation errors. Where the cortex is well defined, estimation errors are likely to be well within these bounds: witness the (pink) regions in the surface error maps (FIGS. 12 and 13, (g) and (n)), where the error is everywhere less than 0.5 mm.

We have described a method for estimating cortical thickness from, inter alia, clinical CT data. In a series of cadaveric experiments using standard MDCT (589 μm/pixel resolution, in-plane blur well approximated by a Gaussian PSF of standard deviation 1.25 mm), the method was able to produce unbiased estimates down to 0.3 mm. Errors were observed to be −0.01±0.58 mm over the full range of thicknesses, and 0.01±0.47 mm for thin cortices in the range 0.3 mm to 2 mm. This is a clear improvement over the alternative thresholding and 50% relative threshold techniques, which are particularly poor when the cortex is thin. Thin cortices are precisely those likely to be of most clinical interest.

The method is highly automated and typically produces 17,000 independent thickness estimates over the surface of the proximal femur. These can be displayed as a colour map painted onto the surface, and visualized from any angle. Workflow is already in the realms of clinical practicality: around 10 minutes to segment the surface, then around 5 minutes to calculate the thicknesses, using just a modest laptop computer. Faster segmentation might be possible with the use of anatomically specific tools.

To validate the technique in vivo, using CT slice thicknesses of 3 mm and above, FIGS. 14 and 15 give grounds for optimism. In the longer term, it is anticipated that cortical thickness maps, like the ones in FIGS. 12-15, will become a useful tool for both medical research and clinical practice. With inter-subject registration, statistical atlases could be constructed showing cortical thickness over the proximal femur for different groups: e.g. young vs. old, trochanteric vs. femoral neck fractures, cases vs. controls. By comparing such atlases, regions of interest might emerge to serve as biomarkers indicative of fracture risk. Cortical thickness maps might also inform longitudinal studies of patients undergoing anabolic therapy, by determining precisely where any thickening occurs.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A method of determining data defining an estimate of the thickness of a tissue structure from tomographic imaging data, the method comprising:
   inputting a tomographic imaging data set defining at least one slice through a region of tissue including said tissue structure;
   modelling said tissue structure as a variation of an imaging parameter of said imaging data along a line crossing said tissue structure, wherein said imaging parameter comprises a measure of bone density, a tissue structure model defined by said variation having at least a first tissue modelling parameter defining a modelled value of said imaging parameter along said line and within said tissue structure and having at least one parameter defining said thickness of said tissue structure;
   modelling a variation of said tomographic imaging data along said line as a blurred version of said variation of said imaging parameter modelling said tissue structure to provide a blurred tomographic imaging model, said blurred version of said variation of said imaging parameter being defined by a blurring function applied to said tissue structure model, wherein said blurred tomographic imaging model has a blurring parameter representing a degree of blurring applied by said blurring function;
   determining a constraining value of said first tissue modelling parameter; and
   fitting said blurred tomographic imaging model defining said blurred version of said variation of said imaging parameter along said line, to data derived from said tomographic imaging data set;
   wherein said fitting comprises holding said first tissue modelling parameter substantially at said constraining value and allowing variation of said blurring parameter and said at least one parameter defining said thickness of said tissue structure to determine said at least one parameter defining said thickness of said tissue structure; and
   wherein said at least one parameter defining said thickness of said tissue structure comprises said data defining said estimate of said thickness of said tissue structure.

2. A method as claimed in claim 1 wherein said tomographic imaging data comprises X-ray computed tomography data, wherein said tissue structure comprises cortical bone.

3. A method as claimed in claim 1 wherein said tissue structure model has second and third tissue modelling parameters defining values of said imaging parameter along said line outside said tissue structure respectively to either side of said tissue structure, wherein said at least one parameter defining said thickness of said tissue structure comprises two position values defining positions of boundaries along said line between regions where said imaging parameter has values defined by said first tissue modelling parameter and by said second and third tissue modelling parameters respectively, and wherein said fitting comprises determining values for said second and third modelling parameters.

4. A method as claimed in claim 1, wherein said line lies out of a plane defined by said at least one slice through said region of tissue, wherein said blurring parameter comprises an in-plane blurring parameter defining a degree of blurring in said plane of said slice, and wherein said blurred tomographic imaging model further comprises an out-of-plane blurring parameter defining a degree of blurring dependent on an angle between said line and said plane of said slice.

5. A method as claimed in claim 4 further comprising determining said angle between said line and a normal to said plane of said slice and constraining said out-of-place blurring parameter dependent on said determined angle during said fitting.

6. A method as claimed in claim 1 further comprising identifying a 3-D outer surface of said tissue structure from said tomographic imaging data set, identifying at least one surface normal to said outer surface, and aligning said line along a direction of said surface normal.

7. A method as claimed in claim 6 comprising identifying a plurality of said surface normals and, repeating said fitting of said blurred tomographic imaging model along a plurality of said lines each defined by one of said surface normals to determine a plurality of said estimates of thickness of said tissue structure, and storing or outputting thickness map data defining a map of said estimated thickness conforming to said outer surface of said tissue structure.

8. A method as claimed in claim 7 further comprising displaying said map to a user as a 3-D representation of said outer surface of said tissue structure painted with a colour or greyscale or patterned to represent variations of said estimated thickness over said outer surface.

9. A method as claimed in claim 1 used to locate the position of one or both of an inner boundary and an outer boundary of said tissue structure, wherein said at least one parameter defining said thickness of said tissue structure comprises positions of said inner and outer boundaries.

10. A method as claimed in claim 1 wherein said tissue structure comprises a layer of tissue, and wherein said tissue structure model defines a substantially constant value of said first tissue modelling parameter within said layer of tissue along said line, such that said model assumes a substantially constant value of said first tissue modelling parameter within a thickness of said layer of tissue.

11. A non-transitory storage medium storing processor control code to, when running on a processor, causes said processor to implement the method of claim 1.

12. A tissue structure thickness estimation apparatus for determining data defining an estimate of the thickness of a tissue structure from tomographic imaging data, the apparatus comprising:
   an input for inputting a tomographic imaging data set defining at least one slice through a region of tissue including said tissue structure;
   working memory for storing data;
   a non-transitory storage medium storing processor control code; and
   a processor coupled to said input, to said working memory, and to said and
   wherein said stored processor control code comprises code to, when running on said processor, causes said processor to:
   model said tissue structure as a variation of an imaging parameter of said imaging data along a line crossing said tissue structure, wherein said imaging parameter comprises a measure of bone density, a tissue structure model defined by said variation having at least a first tissue modelling parameter defining a modelled value of said imaging parameter along said line and within said tissue structure and having at least one parameter defining said thickness of said tissue structure;

model a variation of said tomographic imaging data along said line as a blurred version of said variation of said imaging parameter modelling said tissue structure to provide a blurred tomographic imaging model, said blurred version of said variation of said imaging parameter being defined by a blurring function applied to said tissue structure model, wherein said blurred tomographic imaging model has a blurring parameter representing a degree of blurring applied by said blurring function;

determine a constraining value of said first tissue modelling parameter; and said blurred tomographic imaging model defining said blurred version of said variation of said imaging parameter along said line, to data derived from said tomographic imaging data set;

wherein said fitting comprises holding said first tissue modelling parameter substantially at said constraining value and allowing variation of said blurring parameter and said at least one parameter defining said thickness of said tissue structure to determine said at least one parameter defining said thickness of said tissue structure; and wherein said at least one parameter defining said thickness of said tissue structure comprises said data defining said estimate of said thickness of said tissue structure.

13. A method of estimating the position of an edge of or the thickness of cortical bone from CT data, the method comprising:

modelling a CT image of said cortical bone using a piecewise constant bone density model blurred by a CT imaging blurring function;

fitting said CT data to said modelled blurred CT image by allowing said blurring function to vary whilst constraining a value of cortical bone density represented by said bone density model to be substantially fixed; and estimating said position of said edge or said thickness of said cortical bone from a parameter of said fitted model at a plurality of positions, around a 2-D perimeter or over a 3-D surface of said cortical bone by, at each said position, determining a perimeter normal or surface normal and performing said modelling and fitting along a direction defined by said periemter normal or surface normal at said position.

14. A method as claimed in claim 13 further comprising estimating a fixed value for said cortical bone density represented by said bone density model from said CT data prior to said fitting.

15. A method as claimed in claim 13 wherein said piecewise constant bone density model is blurred by an in-plane blurring function and an out-of-plane blurring function, said in-plane blurring function representing blurring in a planar slice of said CT data, said out-of-plane representing blurring resulting from an angle between said planar slice and a normal to a surface of said cortical bone at a point where said CT data is fitted being less than 90 degrees.

16. A non-transitory storage medium storing processor control code to, when running on a processor, causes said processor to implement the method of claim 13.

17. An apparatus for estimating the position of an edge of or the thickness of cortical bone from CT data, the apparatus comprising:

working memory for storing data;

a non-transitory storage medium storing processor control code; and a processor coupled to said input, to said working memory, and to said non-transitory storage medium; and wherein said stored processor control code comprises code to, when running on said processor, causes said processor to:

model a CT image of said cortical bone using a piecewise constant bone density model blurred by a CT imaging blurring function;

fit said CT data to said modelled blurred CT image by allowing said blurring function to vary whilst constraining a value of cortical bone density represented by said bone density model to be substantially fixed; and estimate said position of said edge or said thickness of said cortical bone from a parameter of said fitted model at a plurality of positions, around a 2-D perimeter or over a 3-D surface of said cortical bone by, at each said position, determining a perimeter normal or surface normal and performing said modelling and fitting along a direction defined by said perimeter normal or surface normal at said position.

18. A method of providing a representation of cortical bone thickness from CT data, the method comprising:

inputting CT image data of said cortical bone;

generating a 2-D or 3-D needle map of an outer perimeter or surface of said cortical bone, said needle map defining a plurality of perimeter normals or surface normals to said cortical bone at a plurality of respective portions on said outer perimeter or surface;

determining a thickness estimate of said cortical bone at each of said positions along a direction of a respective said perimeter normal or surface normal for the position; and generating mapping data representing a 2-D or 3-D map defining said estimated cortical thickness at each of said plurality of positions overlaid on a respective 2-D representation of said perimeter or 3-D representation of said surface of said cortical bone.

19. A method as claimed in claim 18 comprising displaying said map to a user as a representation of said cortical bone painted with colour or greyscale or patterned to represent variations of said estimated thickness over said cortical bone.

20. An apparatus for providing a representation of cortical bone thickness from CT data, the apparatus comprising:

working memory for storing data;

a non-transitory storage medium storing processor control code; and a processor coupled to said input, to said working memory, and to said non-transitory storage medium; and wherein said stored processor control code comprises code to, when running on said processor, causes said processor to:

input CT image data of said cortical bone;

generate a 2-D or 3-D needle map of an outer perimeter or surface of said cortical bone, said needle map defining a plurality of perimeter normals or surface normals to said cortical bone at a plurality of respective portions on said outer perimeter or surface;

determine a thickness estimate of said cortical bone at each of said positions along a direction of a respective said perimeter normal or surface normal for the position; and generate mapping data representing a 2-D or 3-D map defining said estimated cortical thickness at each of said plurality of position overlaid on a respective 2-D representation of said perimeter or 3-D representation of said surface of said cortical bone.

* * * * *